United States Patent
Akasa et al.

(10) Patent No.: US 6,755,401 B2
(45) Date of Patent: Jun. 29, 2004

(54) FLUID-FILLED VIBRATION DAMPING DEVICE

(75) Inventors: Shouji Akasa, Ichinomiya (JP); Katsuhiko Katagiri, Ichinomiya (JP); Yuichi Ogawa, Kasugai (JP); Hideki Maehashi, Kasugai (JP); Akio Saiki, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/196,505

(22) Filed: Jul. 15, 2002

(65) Prior Publication Data

US 2003/0011115 A1 Jan. 16, 2003

(30) Foreign Application Priority Data

Jul. 16, 2001 (JP) ........................................ 2001-215551

(51) Int. Cl.[7] .............................................. F16F 13/00
(52) U.S. Cl. ............................ 267/140.11; 267/140.13
(58) Field of Search ..................... 267/140.11, 140.13, 267/140.14, 141, 219, 140.15

(56) References Cited

U.S. PATENT DOCUMENTS

| | | | | |
|---|---|---|---|---|
| 5,170,998 A | * | 12/1992 | Muramatsu ............. | 267/140.13 |
| 5,217,211 A | * | 6/1993 | Ide et al. ............... | 267/140.13 |
| 5,246,212 A | * | 9/1993 | Funahashi et al. ..... | 267/140.13 |
| 5,775,666 A | | 7/1998 | Tsukamoto et al. | |
| 5,992,833 A | * | 11/1999 | Tanahashi .............. | 267/140.14 |
| 6,224,045 B1 | * | 5/2001 | Muramatsu et al. ... | 267/140.13 |
| 6,523,813 B1 | * | 2/2003 | Kato ..................... | 267/140.11 |

FOREIGN PATENT DOCUMENTS

JP          9-89037         3/1997

* cited by examiner

Primary Examiner—Robert A. Siconolfi
Assistant Examiner—Melanie Torres
(74) Attorney, Agent, or Firm—Beyer Weaver & Thomas, LLP

(57) ABSTRACT

A fluid-filled vibration-damping device includes an elastic body elastically connecting a first and a second mounting member so as to close one open-end portion of the second mounting member, and a partition member assembled with the second mounting member on one side thereof to form therebetween a pressure-receiving chamber partially defined by the elastic body and assembled with a fixing member on the other side thereof to form an equilibrium chamber partially defined by a flexible layer supported by one pen-end portion of the fixing member. The partition member includes a first and second fixing grooves axially spaced apart from each other with an intermediate portion therebetween, to which the other open-end portions of the second mounting and fixing members are respectively press-fitted, and an air passage for connecting a working air chamber to an external air conduit is open in the intermediate portion.

12 Claims, 3 Drawing Sheets

FLUID-FILLED VIBRATION DAMPING DEVICE

INCORPORATED BY REFERENCE

The disclosure of Japanese Patent Application No. 2001-215551 filed on Jul. 16, 2001 including the specification, drawings and abstract is incorporated herein by reference in its entirety.

BACKGROUND OF THE INVENTION

1. Field of the Invention

The present invention relates generally to a fluid-filled vibration damping device that exhibit vibration damping effect on the basis of flows of a non-compressible fluid filled therein. More particularly, the present invention is concerned with a pneumatically controlled fluid-filled vibration damping device that is capable of controlling its vibration damping characteristics by suitably changing an air pressure applied from an external air source to an air chamber formed in the vibration damping device, and that is suitably adoptable as an engine mount for use in an automotive vehicle.

2. Description of the Related Art

JP-A-10-339350 discloses a known example of a fluid-filled vibration damping device in which a first mounting member and a second mounting member are disposed in a mutually spaced apart relationship with each other, and are elastically connected with each other by an elastic body interposed therebetween, while a partition member is supported by the second mounting member so that a primary fluid chamber and an equilibrium chamber, which are both filled with a non-compressible fluid such as water, are formed on both sides of the partition member and held in fluid communication with each other via an orifice passage. The disclosed fluid-filled vibration-damping device is able to exhibit vibration damping effect on the basis of flows of the fluid through the orifice passage, upon application of a vibrational load between the first and second mounting members.

For assuring further improved damping effect, it has been proposed to modify the fluid-filled vibration damping device such that the pressure-receiving chamber is partially defined by a movable member disposed in a displaceable or deformable manner, and a working air chamber is formed by and between the movable member and the partition member. This proposed modification makes it possible to control vibration-damping characteristics of the fluid-filled vibration-damping device according to input vibrations. Namely, a suitable air pressure variation whose frequency corresponding to that of the input vibrations is applied to the working air chamber, so that the modified fluid-filled vibration-damping device can actively offset or absorb input vibrations with the help of the air pressure variation applied to the working air chamber, for example, thereby actively controlling fluid pressure variation in the pressure-receiving chamber. Alternatively, the modified fluid-filled vibration-damping device is capable of controlling its passive vibration damping effect. Namely, the tuning frequency of the orifice passage may be desirably changed by suitably changing the air pressure level in the working air chamber so as to adjust wall spring characteristics of the movable member, i.e., the pressure-receiving chamber.

As disclosed in the aforementioned JP-A-10-339350, the conventional fluid-filled vibration damping device has a structure in which the second mounting member is formed of a generally cylindrical metallic member. One of axially opposite open-end of the second mounting member is fluid-tightly closed by a flexible rubber layer, and a artition member is press-fitted and fixedly disposed in a bore of the second mounting member. The other open-end of the second mounting member is fluid-tightly closed by the elastic body with the other open-end of the second mounting member being press-fitted onto a metallic sleeve that is bonded to an outer circumferential surface of the elastic body upon vulcanization of a rubber material to form the elastic body. Thus, a fluid-tightly closed interior space of the second mounting member is divided into two chambers, i.e., a pressure-receiving chamber partially defined by the elastic body and an equilibrium chamber partially defined by the flexible rubber layer, which are both filled with a non-compressible fluid.

However, the conventional fluid-filled vibration damping device constructed as described above inevitably requires a relatively large axial length of the second mounting member in order to receive the partition member in its bore. This makes it cumbersome to manufacture the second mounting member, pushing up a manufacturing cost. Also, the relatively long cylindrical second mounting member makes it difficult not only to assemble the partition member into the bore of the second mounting member, but also to bond the flexible rubber layer to the one open-end of the second mounting member in a process of vulcanization of a rubber material to form the flexible rubber layer, resulting in low manufacturing efficiency. In addition, since the other open-end of the second mounting member is press-fitted onto the metallic sleeve bonded to the outer circumferential surface of the elastic body, the conventional fluid-filled vibration damping device does not assure a sufficient bonding strength in its axial direction.

Moreover, the conventional fluid-filled vibration damping device generally has a specific structure for permitting a connection of a port of an air passage formed through the partition member with an external air conduit, as disclosed in the aforementioned document No. JP-A-10-339350. Namely, the second mounting member is formed with a window formed through its cylindrical wall portion so that the port of the air passage is open to the external area through the window of the second mounting member. In general, the second mounting member is subjected to a drawing operation, e.g., all directional drawing, after being mounted onto the partition member so that the second mounting member is radially inwardly drawn onto and fixedly mounted onto the partition member. In the drawing operation, the presence of the window formed through the cylindrical wall portion of the second mounting member may cause a local decrease in strength of the second mounting member. This is prone to cause irregular deformation of the second mounting member, leading to an undesirable leakage of the non-compressible fluid through the interface between the partition member and the second mounting member. Thus, the conventional fluid-filled vibration-damping device suffers from difficulty in assuring a sufficient fluid-tight sealing with high stability.

Further, in the aforementioned drawing operation, it is required to precisely position the air port of the air passage formed in the partition member and the window of the second mounting member relative to each other, making it cumbersome to assemble the second mounting member and the partition member, resulting in a low manufacturing efficiency.

SUMMARY OF THE INVENTION

It is therefore one object of this invention to provide a pneumatically controlled fluid-filled vibration damping device, which is novel and simple in structure, which is easy to manufacture, and which assures high fluid-tight sealing in a pressure-receiving chamber and an equilibrium chamber.

The above and/or other objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A fluid-filled vibration-damping device for connecting two members in a vibration damping fashion, which includes (a) a first mounting member adapted to be fixed to one of the two members; (b) a second mounting member adapted to be fixed to an other one of the two members and having a cylindrical portion, while being disposed relative to the first mounting member such that one of axially opposite open-end portions of the cylindrical portion of the second mounting member is opposed to the first mounting member with an axial spacing therebetween; (c) an elastic body elastically connecting the first mounting member and the second mounting member with an outer circumferential surface thereof being bonded to the cylindrical portion of the second mounting member; (d) a first partition member fixedly supported by the cylindrical portion of the second mounting member so as to form at one of axially opposite sides thereof a pressure-receiving chamber partially defined by the elastic body and at an other one of axially opposite sides thereof an equilibrium chamber partially defined by a flexible layer. The pressure-receiving chamber and the equilibrium chamber are filled with a non-compressible fluid, and are held in fluid communication with each other through a first orifice passage at least partially defined by the first partition member. The fluid-filled vibration-damping device further includes (e) a movable member partially defining the pressure-receiving chamber and being supported by the first partition member in a movable manner, (f) a working air chamber defined by and between the movable member and the first partition member and being open to an external area through an air passage formed through the first partition member, and (g) a fixing member having a fixing sleeve portion and fixedly assembling a peripheral portion of the flexible layer to the first partition member. In this fluid-filled vibration-damping device, the first partition member includes a first fixing groove and a second fixing groove, which are axially spaced apart from each other and open in an outer circumferential surface of said first partition member, while extending in a circumferential direction of said first partition member. Also, the first partition member is assembled with the second mounting member such that the cylindrical portion of the second mounting member is fixedly disposed radially outwardly on one of axially opposite end portions of the first partition member with an other one of axially opposite open-end portions of the cylindrical portion thereof being press-fitted into the first fixing groove of said first partition member, and is assembled with the fixing member such that the fixing sleeve portion of the fixing member is fixedly disposed radially outwardly on the other one of axially opposite end portions of the first partition member with one of axially opposite open end portions of the fixing sleeve portion being press-fitted into the second fixing groove of the first partition member. In this fluid-filled vibration-damping device, the air passage is open in an axially intermediate portion of the outer circumferential surface of the first partition member, which is axially interposed between the first and second fixing grooves and exposed to an atmosphere, such that an opening of the air passage is connectable to an external air conduit.

In the fluid-filled vibration damping device according to this mode of the invention, the fixing member by which the peripheral portion of the flexible layer is fixedly assembled with the first partition member, is formed independently of the second mounting member to which the elastic body is bonded. This arrangement makes it possible to directly bond the elastic body to the cylindrical portion of the second mounting member in the process of vulcanization of the rubber material to form the elastic body, without needing the conventionally required metallic sleeve. Therefore, the present fluid-filled vibration-damping device is made simple in construction and is able to exhibit improved bonding strength and durability between the elastic body and the second mounting member, in comparison with the conventional fluid-filled vibration damping device in which the elastic body is indirectly bonded to the second mounting member such that the elastic body is bonded to the metallic sleeve upon vulcanization of the rubber material to form the elastic body, and then the second mounting member is press-fitted onto the metallic sleeve.

In the present fluid-filled vibration damping device, the axially intermediate portion of the outer circumferential surface of the first partition member is exposed to the atmosphere, and the opening of the air passage is formed so as to be located on the intermediate portion of the outer circumferential surface of the first partition member. This arrangement makes it possible to eliminate the conventional need for forming windows through the cylindrical portion of the second mounting member, which is fixedly mounted on the first partition member so as to seal the pressure-receiving chamber and the equilibrium chamber, and the fixing sleeve portion of the fixing member. Therefore, the cylindrical portion of the second mounting member and the fixing sleeve portion of the fixing member can be fixed to the first partition member with excellent fluid-tightness and stability, thus assuring high fluid-tight sealing at the pressure-receiving chamber and the equilibrium chamber with high reliability.

Since the second mounting member and the fixing member are formed independent of each other in the present fluid-filled vibration-damping device, these two members can be made small in their axial length. This makes it possible to reduce the number of manufacturing steps, in the case where the second mounting member and the fixing member are formed of metal by pressing, for example. Thus, the second mounting member and the fixing member can be manufactured with improved efficiency.

Preferably, the cylindrical portion of the second mounting member and the fixing sleeve portion of the fixing member are provided with engaging hooks at their open end portions, before these members are assembled with the first partition member. Namely, one of axially opposite open-end portions of the cylindrical portion of the second mounting member is bend radially inwardly over its entire circumference to form the engaging hook. Likewise, one of axially opposite open-end portions of the fixing sleeve portion of the fixing member is bend radially inwardly over its entire circumference. Then, these open-end portions provided with the engaging hooks of the cylindrical portion of the second mounting member and the fixing sleeve portion of the fixing member are mounted onto the axially opposite end portions of the first partition member, respectively. The second mounting member and the fixing member, which are assembled with the first partition member as described above, are then subjected to a suitable drawing operation to be drawn onto the first partition member, so that the engaging hooks of the second mounting member and the fixing member are press-fitted into the first and second fixing grooves, respectively. A variety of methods may be employed to form the engaging hook at the open-end portion of the second mounting member or the fixing member. For instance, the second mounting member or the fixing member may be formed of a metallic plate by drawing into a cylindrical cup shaped member, and then the central area of the bottom wall portion of the formed second mounting member or the fixing member is cut off by punching. This makes it possible to integrally form the engaging hook at the open-end portion of the second mounting member and the fixing member, simultaneously.

The movable member may be formed by a rubber elastic body having a suitable thickness, for example. Preferably, a peripheral portion of the movable member is fluid-tightly bonded to the first partition member. This arrangement makes it possible not only to transmit a pressure change in the working air chamber to the pressure-receiving chamber with high efficiency, but also to exhibit a desired fluid-tight sealing of the working air chamber with ease. In the present mode of the invention, the movable member may be formed of a rubber elastic body having a suitable thickness. In this case, elastic deformation of the movable member should be interpreted as the displacement of the movable member. A variety of structures may be employed to fix the peripheral portion of the flexible layer to the first partition member. Preferably, the following mode (2) or (3) may be employed to this end.

(2) A fluid-filled vibration-damping device according to the above-indicated mode (1), wherein the fixing member has a cylindrical configuration, and the peripheral portion of the flexible layer is bonded to the fixing member upon vulcanization of a rubber material to form the flexible layer. This arrangement makes it possible to reduce the number of component and to simplify the structure of the device, effectively.

(3) A fluid-filled vibration-damping device according to the above-indicated mode (1), further includes an annular metallic member formed independently of the fixing member. In this device, the peripheral portion of the flexible layer is bonded to the annular metallic member, while the annular metallic member is fixed to the first partition member via the fixing member.

(4) A fluid-filled vibration-damping device according to any one of the above-indicated modes (1)–(3), wherein the first partition member has a first recess open to the one of axially opposite sides thereof in which the pressure-receiving chamber is formed, and the movable member fluid-tightly closes an opening of the first recess so that the working air chamber is formed by and between the first recess and the movable member. According to this mode of the invention, the first partition member can effectively provide a space for forming the working air chamber.

(5) A fluid-filled vibration-damping device according to any one of the above-indicated modes (1)–(4), wherein the first partition member has a second recess open to the other one of axially opposite sides thereof in which the equilibrium chamber is formed, and partially defining the equilibrium chamber, and at least one of the opening of the air passage and the first orifice passage is formed in a peripheral portion of the second recess. According to this mode of the invention, the first partition member can effectively provide a space for forming the equilibrium chamber with a sufficient volume, and a space for forming at least one of the openings of the air passage and the first orifice passage as well, at the peripheral portion of the second recess.

(6) A fluid-filled vibration-damping device according to any one of the above-indicated modes (1)–(5), wherein the axially intermediate portion of the outer circumferential surface of the first partition member has a recess, and the opening of the air passage comprises a cylindrical port protruding from a bottom surface of the recess into an inside the recess. The cylindrical port is connectable with the external air conduit. In the fluid-filled vibration-damping device according to this mode of the invention, the protruding cylindrical port is housed within the recess, thus improving manufacturing efficiency. Namely, the presence of the recess formed around the cylindrical port makes it easy to connect the external air conduit with the cylindrical port, while effectively preventing the cylindrical port from being damaged during manufacture or shipment of the fluid-filled vibration-damping device.

(7) A fluid-filled vibration-damping device according to any one of the above-indicated modes (1)–(5), wherein the opening of the air passage comprises a cylindrical port that is formed on and protrudes from the axially intermediate portion of the outer circumferential surface of the first partition member, and that is connectable with the external air conduit. In the fluid-filled vibration-damping device according to this mode of the invention, the cylindrical port can be connected with ease with the external air conduit, in comparison with the case where the cylindrical port is housed in the recess. Moreover, the recess to be formed around the cylindrical port is no longer needed in this mode of the invention, making it possible to reduce the axial length of the first partition member by the axial length of the recess. Thus, the fluid-filled vibration-damping device can be made compact in its axial size.

(8) A fluid-filled vibration-damping device according to any one of the above-indicated modes (1)–(7), wherein the cylindrical portion of the second mounting member and the fixing cylindrical portion of the fixing member are fluid-tightly mounted onto respective portions of the outer circumferential surface of the first partition member with sealing rubber layers interposed therebetween over an entire circumference of the first partition member. The fluid-filled vibration-damping device of this mode of the invention permits a further improved fluid-tight sealing of the pressure-receiving chamber and the equilibrium chamber in an effective and stable manner.

(9) A fluid-filled vibration-damping device according to any one of the above-indicated modes (1)–(8), wherein the first orifice passage is formed at an outer circumferential portion of the first partition member so as to extend with a given circumferential length in a circumferential direction of the first partition member. This arrangement makes it possible to effectively obtain a length of the first orifice passage, thereby enhancing degree of freedom in tuning the first orifice passage. For instance, the first orifice passage may be formed in a spiral shape so that the first orifice member has the length that is larger than a circumference of the first partition member.

(10) A fluid-filled vibration-damping device according to any one of the above-indicated modes (1)–(9), wherein the first partition member has a groove open in the outer circumferential surface thereof and at least one of the cylindrical portion of the second mounting member and the fixing cylindrical portion of the fixing member fluid-tightly closing an opening of said groove so as to at least partially form the first orifice passage. This arrangement makes it possible to provide the first orifice passage with the reduced number of components, with effective utilization of the first partition member and the second mounting member or the fixing member.

(11) A fluid-filled vibration-damping device according to any one of the above-indicated modes (1)–(10), further comprises a second partition member, which is fixedly supported by the partition member, and which divides the pressure-receiving chamber into a primary fluid chamber partially defined by the elastic body and adapted to receive a primary vibrational load, and an auxiliary fluid chamber partially defined by the movable member, and a second orifice passage for fluid communication between the primary fluid chamber and the auxiliary fluid chamber.

The fluid-filled vibration damping device constructed according to this mode of the invention is capable of exhibiting a further improved active or passive vibration damping effect, on the basis of flows of the fluid through the second orifice passage. Described in detail, air pressure variation whose frequency corresponding to that of vibrations to be damped is applied to the working air chamber so that oscillation of said movable member is suitably controlled. This controlled oscillation of the movable member causes pressure variation of the fluid in the auxiliary fluid chamber that is transmitted to the primary fluid chamber, whereby the fluid-filled vibration-damping device can exhibit a high active vibration damping effect with respect to the vibrations to be damped, for example. In this case, the second orifice passage may be suitably tuned so that the fluid pressure variation is transmitted from the auxiliary fluid chamber to the primary fluid chamber with improved efficiency (hereinafter referred to as a "pressure transmission effect"), or so that high frequency components is reduced or minimized when the fluid pressure variation is transmitted from the auxiliary fluid chamber to the primary fluid chamber. Alternatively, a static air pressure applied to the working air chamber is suitable controlled according to frequencies of the vibrations to be damped so as to permit a selective use of the first and second orifice passages, or so as to change the tuning frequency of the second orifice passage. In this case, the fluid-filled vibration-damping device is capable of exhibiting the passive vibration damping effect on the basis of resonance of the fluid flowing through the second orifice passage with respect to vibrations having a plurality of frequencies or over a wide frequency range.

In this mode (11) of the invention, the second orifice passage may be preferably tuned to a frequency range that is substantially equal to an upper limit of the frequency range to which the fluid-filled vibration-damping device is expected to exhibit the active vibration damping effect on the basis of the oscillation of the movable member, so that it is effectively prevented that the high frequency component in the fluid pressure variation in the auxiliary fluid chamber is undesirably transmitted to the primary fluid chamber, when the fluid-filled vibration damping device is operated to exhibit the active vibration damping effect. In the case where the fluid-filled vibration-damping device is operated to exhibit its active vibration damping effect, the pressure transmission effect from the auxiliary fluid chamber to the primary fluid chamber is effectively improved with the help of the resonance of the fluid flowing through the second orifice passage in a frequency range to which the second orifice passage is tuned. Thus, the present fluid-filled vibration-damping device is capable of exhibiting further improved active vibration damping effect.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
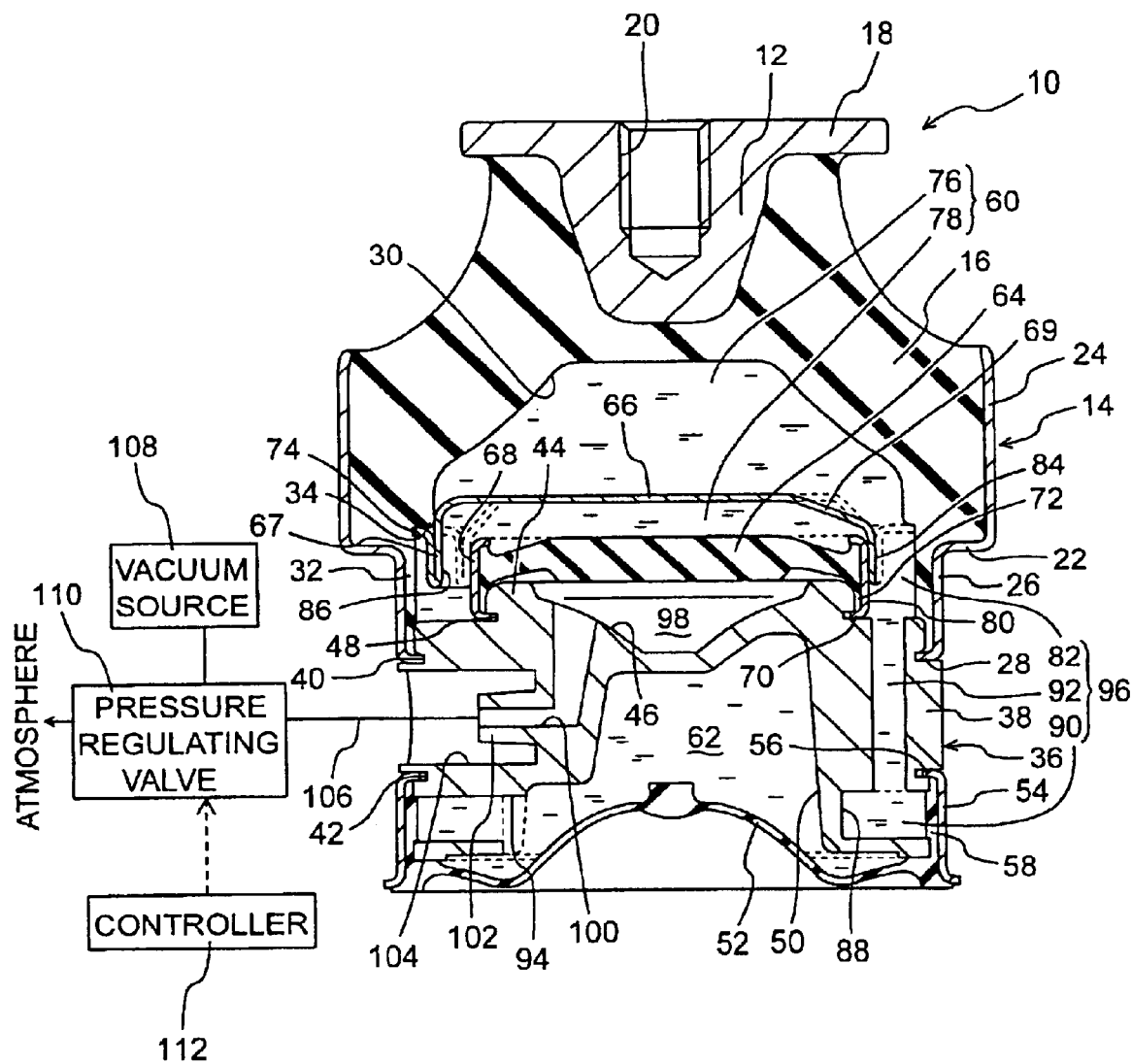
FIG. 1 is an elevational view in axial or vertical cross section of an engine mount for use in an automotive vehicle, which is constructed according to a first embodiment of a fluid-filled vibration-damping device of the invention.

Referring first to FIG. 1, an engine mount 10 is shown as a first embodiment of a fluid-filled vibration-damping device of the present invention. The engine mount 10 is basically constructed such that a first mounting member 12 and a second mounting member 14 are mutually spaced apart from each other, and are elastically connected with each other via an elastic body 16 interposed therebetween. The first mounting member 12 is adapted to be fixed to a member on the side of a power unit of an automotive vehicle, while the second mounting member 14 is adapted to be fixed to a member on the side of a body of the vehicle, so that the engine mount 10 is able to elastically mount the power unit on the body of the vehicle in a vibration damping fashion. Since the engine mount 10 is installed on the vehicle with its central axis extending in the vertical direction as seen in FIG. 1 that is substantially parallel to the vertical direction, there will be described in detail the engine mount 10 in this orientation, basically.

The first mounting member 12 is made of a suitable metallic material, and includes a body portion having an inverted generally frusto-conical shape and an annular plate like flange portion 18 which is integrally formed with the body portion at its large-diameter end, so as to extend radially outwardly from the outer circumferential surface of the body portion. The first mounting member 12 has a tapped hole 20 formed to receive a screw for attaching the first mounting member 12 to the power unit of the vehicle.

The second mounting member 14 is a generally cylindrical metallic member with a relatively large diameter including an axially intermediate shoulder portion 22, a large-diameter portion 24 located on the upper side of the shoulder portion 22, and a small-diameter portion 26 located on the lower side of the shoulder portion 22. That is, the second mounting member 14 provides a cylindrical portion in its entirety. One of axially opposite open end portions of the second mounting member 14, which is located on the side of the small-diameter portion 26, is radially inwardly bent over its entire circumference so as to provide an annular plate-like engaging hook 28 as an integral part of the second mounting member 14. Preferably, the second mounting member 14 is formed by pressing, so that the integrally formed engaging hook 28 can be effectively formed. Namely, a suitable blank is drawn into a cylindrical cup shape with a given axial length, initially. Then, the engaging hook 28 can be formed by punching out a central portion of a bottom wall portion of the cylindrical cup shaped member. The second mounting member 14 is press fitted into a bore of a suitable cylindrical metal bracket (not shown), and fixed to the body of the vehicle via the bracket. The second mounting member 14 is disposed relative to the first mounting member 12 such that the large diameter portion 24 of the second mounting member 14 is opposed to the first mounting member 12 with an axial spacing therebetween. These first and second mounting members 12, 14 are elastically connected with each other via the elastic body 16.

The elastic body 16 has a generally frusto-conical shape having a large-diameter recess 30 open in its large-diameter end face. The first mounting member 12 is bonded to a small diameter portion of the elastic body 16 in the process of vulcanization of a rubber material to form the elastic body 16, with the first mounting member 12 being embedded in the small diameter portion of the elastic body 16. An inner circumferential surface of the large diameter portion 24 of the second mounting member 14 is bonded to the outer circumferential surface of the large diameter portion of the elastic body 16 in the above-mentioned process of vulcanization. That is, the other one of axially opposite open end portion of the second mounting member 14, which is located on the side of the large diameter portion 24, is fluid-tightly closed by the elastic body 16. A sealing rubber layer 32, which is integrally formed with the elastic body 16, is formed on and bonded to a substantially entire area of the inner circumferential surface of the small diameter portion 26. The elastic body 16 further includes an annular shoulder portion 34 located near an open-end portion of the recess 30.

A partition member 36 is fixed to the open end portion of the second mounting member 14 on the side of the small diameter portion 26. The partition member 36 is a generally block shaped member made of a rigid material such as a rigid synthetic resin material and a metallic material. The partition member 36 includes a positioning projection 38 integrally formed on and slightly protruding radially outwardly from its outer circumferential surface. The positioning projection 38 extends circumferentially continuously over an entire circumference of the partition member 36. The partition member 36 is further provided with a first and a second fixing groove in the form of a first and second circumferential grooves 40, 42 that are located on the axially upper and lower sides of the positioning projection 38, respectively. Each of the first and second circumferential grooves 40, 42 is open in the outer circumferential surface of the partition member 36, and extending in the circumferential direction with a generally constant width over the entire circumference of the partition member 36. In the present embodiment, the positioning projection 38 has an axial length that is approximately equal to one-third of the entire axial length of the partition member 36, and the first and second circumferential grooves 40, 42 are formed in parallel to each other with the positioning projection 38 interposed therebetween, by way of example. Also, the partition member 36 has a protrusion 44 formed on a central portion of the axially upper end face thereof, so as to extend axially outwardly or upwardly from the axially upper end face. The thus formed protrusion 44 is provided with a first recess 46 open in its protruding end face, and an outer circumferential groove 48 open in its outer circumferential portion and extending with a substantially constant width dimension over the entire circumference thereof. The partition member 36 is further provided with a second recess 50 that is open in a central portion of the axially lower end face.

A flexible member in the form of a flexible diaphragm 52 is disposed below the partition member 36. The flexible diaphragm 52 is formed of a thin rubber layer having a disk-like shape. The flexible diaphragm 52 is fixed at its peripheral portion to a fixing member 54 in the process of vulcanization of a rubber material to form the flexible diaphragm 52, with a given amount of sag. The fixing member 54 is made of metal and has a large-diameter hollow cylindrical shape in its entirety. In this embodiment, the fixing member 54 provides a fixing cylindrical portion in its entirety. An axially upper open end portion of the fixing member 54 is radially inwardly bent over its entire circumference so as to provide an annular plate engaging hook 56 as an integral part of the second mounting member 14. Preferably, the fixing member 54 is formed by pressing, so that the integrally formed engaging hook 56 can be effectively formed. Namely, a suitable blank is drawn into a cylindrical cup shape with a given axial length, and then the engaging hook 56 can be formed by punching out a central portion of a bottom wall portion of the cylindrical cup shaped member. On the other hand, an axially lower open end portion of the fixing member 54 is fluid-tightly closed by the flexible diaphragm 52 with the peripheral portion of the flexible diaphragm 52 being bonded to an inner circumferential surface of the axially lower open end portion of the fixing member 54. As is apparent from the foregoing description, the flexible diaphragm 52 and the fixing member 54 are formed as an integral vulcanized assembly. The inner circumferential surface of the fixing member is coated substantially entirety by a sealing rubber layer 58 integrally formed with the flexible diaphragm 52.

The axially upper end portion of the partition member 36 is inserted into the small diameter portion 26 of the second mounting member 14 until the axially upper end face of the positioning projection 38 is brought into abutting contact with the engaging hook 28 formed in the open-end portion of the small-diameter portion 26 of the second mounting member 14. It is noted that the axially upper end face of the positioning projection 38 provides an axially inner or lower-side wall of the first circumferential groove 40, which extends radially outwardly with an radial length that is made larger than that of an axially outer or upper-side wall of the first circumferential groove 40. This arrangement permits a suitable positioning of the engaging hook 28 relative to the first circumferential groove 40. With the partition member 36 and the second mounting member 14 positioned relative to each other in the axial direction as described above, a suitable drawing operation, such as an all directional drawing, is performed on the second mounting member 14 so as to decrease a diameter of the second mounting member 14. As a result, the engaging hook 28 formed in the small diameter portion 26 of the second mounting member 14 is forcedly press-fitted into the first circumferential groove 40 formed in the axially upper side of the positioning projection 38 of the partition member 36. Thus, the axially lower open end portion of the second mounting member 14 on the side of the small diameter portion 26 is fluid-tightly closed by the partition member 36. On the other hand, the axially lower end portion of the partition member 36 is inserted into the fixing member 54 until the axially lower end face of the positioning projection 38 is brought into abutting contact with the engaging hook 56 formed in the axially upper end portion of the fixing member 54. Like the first circumferential groove 40, the axially lower end face of the positioning projection 38 provides an axially inner or upper-side wall of the second circumferential groove 42, which extends radially outwardly with an radial length that is made larger than that of an axially outer or lower-side wall of the second circumferential groove 42. This arrangement permits a suitable positioning of the engaging hook 56 relative to the second circumferential groove 42. With the partition member 36 and the fixing member 54 positioned relative to each other in the axial direction as described above, a suitable drawing operation, such as an all directional drawing, is performed on the fixing member 54 so as to decrease a diameter of the fixing member 54. As a result, the engaging hook 56 formed in the fixing member 54 is forcedly press-fitted into the second circumferential groove 42 formed in the axially lower side of the positioning projection 38 of the partition member 36. Thus, the axially upper open-end portion of the fixing member 54 is fluid-tightly closed by the partition member 36. In this respect, the above-described drawing operations may be simultaneously performed on the second mounting member 14 and the fixing member 54. In a state where the second mounting member 14 and the fixing member 54 are assembled with the partition member 36 as described above, the outer diameter of the small diameter portion 26 of the second mounting member 14 is made substantially equal to that of the fixing member 54, and the outer diameter of the positioning projection 38 of the partition member 36 is made slightly smaller than those of the small diameter portion 26 of the second mounting member 14 and the fixing member 54.

With the partition member 36 being assembled with the second mounting member 14 and the fixing member 54 as described above, a pressure-receiving chamber 60 is formed on the axially upper side of the partition member 36, while an equilibrium chamber 62 is formed on the axially lower side of the partition member 36 as seen in FIG. 1. The pressure-receiving chamber 60 is partially defined by the elastic body 16 and is filled with a non-compressible fluid. On the other hand, the equilibrium chamber 62 is partially defined by the flexible diaphragm 52 is filled with the non-compressible fluid, too. A various kinds of non-compressible fluids such as water, alkylene glycol, polyalkylene glycol, or silicone oil, may be adoptable in the present invention. For effective damping of input vibrations based on resonance of the fluid, which will be described later, it may be preferable to fill the pressure-receiving chamber 60 and the equilibrium chamber 62 with a low-viscosity fluid whose viscosity is not higher than 0.1 Pa·s.

The pressure-receiving chamber 60 houses therein a movable member in the form of a movable rubber plate 64 and a second partition member 66. The movable rubber plate 64 has a disk-like shape with a given thickness, and is bonded at its peripheral portion to a support sleeve 68 formed of a thin walled cylindrical metallic member, in the process of vulcanization of a rubber material for forming the movable rubber plate 64. The axially lower end portion of the support sleeve plate 68 is radially inwardly bent over its entire circumference so as to provide a radially inward projection 70 as an integral part of the support sleeve 68. The inner circumferential surface of the support sleeve 68 is coated substantially entirety by a sealing rubber 72 integrally formed with the movable rubber layer 64.

On the other hand, the second partition member 66 has an inverted cup shape in its entirety, and is formed of metal by pressing, for example. A cylindrical wall portion of the second partition member 66 has an open-end portion of double walled structure in which the cylindrical wall portion is bent outward and placed onto an outer circumferential surface of the cylindrical wall portion. The tip end of the bent wall portion is bent radially outwardly to thereby provide an outward flange portion 74 in an axially intermediate portion of the second partition member 66. This second partition member 66 includes a large diameter portion 67 and a cutout for partially providing a communication hole 84, which are located in respective circumferential positions that are opposed to each other in a diametric direction of the second partition member 66. A peripheral portion of the top wall of the second partition member 66 has a sloped portion 69 at one circumferential portion located adjacent to the communication hole 84.

The support sleeve 68 is disposed radially outwardly on the projection 44 of the partition member 36, and is radially inwardly drawn onto an outer circumferential surface of the projection 44. As a result, the radially inner projection 70 formed at the lower end portion of the support sleeve 68 is forcedly press-fitted into the outer circumferential groove 48 open in the outer circumferential surface of the projection 44, whereby the movable rubber plate 64 is fluid-tightly fixed to the peripheral portion of the projection 44. Further, the cylindrical wall portion of the second partition member 66 is press-fitted onto the support sleeve 68 that is fixed to the partition member 36 as described above. In this state, the outward flange 74 of the second partition member 66 is fluid-tightly held in abutting contact with the annular shoulder portion 34 of the elastic body 16.

That is, the pressure-receiving chamber 60 is divided by the second partition member 66 into two chambers, i.e., a primary fluid chamber 76 formed on the axially upper side of the second partition member 66 and partially defined by the elastic body 16, and an auxiliary fluid chamber 78 formed on the axially lower side of the second partition member 66 and partially defined by the movable rubber plate 64. The first and second partition members 36, 66 cooperate to define a groove 80 extending circumferentially and open to the radially outward direction. The opening of the groove 80 is fluid-tightly closed by the second mounting member 14, thereby providing a second orifice passage 82 for damping high-frequency vibrations, which extends circumferentially around the support sleeve 66. One of opposite end of the second orifice passage 82 is open to the primary fluid chamber 76 through the communication hole 84 formed through the outward flange 74 of the second partition member 66, and the other end of the second orifice passage 82 is open to the auxiliary fluid chamber 78 through a communication passage formed between an inner circumferential surface of the large diameter portion 67 of the second partition member 66 and an outer circumferential surface of the support sleeve 68. Thus, the primary fluid chamber 76 and the auxiliary fluid chamber 78 are held in fluid communication through the second orifice passage 82. In the present embodiment, the second orifice passage is tuned so that the engine mount 10 can exhibit an excellent vibration damping effect on the basis of resonance or flows of the fluid through the second orifice passage 82 with respect to high frequency vibrations, such as idling vibrations and the like, by way of example.

Further, the partition member 36 is provided with a circumferential groove 88 that is open in an outer circumferential surface of a cylindrical wall portion of the second recess 50, and that extends in the circumferential direction. The circumferential groove 88 is located below the second circumferential groove 42. The opening of the circumferential groove 88 is fluid-tightly closed by the fixing member 54 that is fixed to the partition member 36 as described above, to thereby form a downside fluid passage 90 extending circumferentially. One of circumferentially opposite ends of the downside fluid passage 90 is open to the second orifice passage 82 through a communication passage 92 that axially extends through the cylindrical wall portion of the second recess 50. The other end of the downside fluid passage 90 is open to the equilibrium chamber 62 through a communication hole 94 formed through the bottom wall of the circumferential groove 88. Namely, a part of the second orifice passage 82, the communication passage 92 and the downside fluid passage 90 cooperate to form a first orifice passage 96 for damping low frequency vibrations, that permits a fluid communication between the primary fluid chamber 76 that partially constitutes the pressure-receiving chamber 60, and the equilibrium chamber 62. The first orifice passage 96 is tuned so that the engine mount 10 can exhibit an excellent vibration damping effect on the basis of resonance or flows of the fluid through the first orifice passage with respect to low frequency vibrations, such as engine shakes and the like, by way of example.

In a state where the support sleeve 68 is fixed to the partition member 36 as described above, the movable rubber plate 64 is disposed above the first recess 46 in its horizontal attitude so that the movable rubber plate 64 is elastically deformable. The opening of the first recess 46 is fluid-tightly closed by the movable rubber plate 64 so that the movable rubber plate 64 and the recess 46 cooperate to define therebetween a working air chamber 98. An air passage 100 is formed through the partition member 36 and open in a bottom surface of the first recess 46 at one end. Thus, the working air chamber 98 is open to the atmosphere through the air passage 100.

The other end of the air passage 100 is formed as a port 102 located in an axially intermediate portion of the outer circumferential surface of the partition member 36, which portion is exposed to the atmosphere, that is, located in an outer circumferential surface of the positioning projection 38. In this respect, the partition member 36 has a recess 104 open in the outer circumferential surface of the positioning projection 38, and the port 102 is disposed within the recess 104. This recess 104 radially extends with a generally constant cross sectional shape. The port 102 is integrally formed on and protruding radially outwardly from a bottom wall of the recess 104. The port 102 has a hollow cylindrical shape and has an axial length that is made substantially equal to or smaller than a depth of the recess 104, so as not to protrude radially outward from the recess 104. Thus, the port 102 is housed within the recess 104.

A suitable external air conduit 106 can be connected to the port 102 in operation. The external air conduit 106 permits to alternatively connect the working air chamber 98 to the atmosphere and a suitable vacuum source 108. Described in detail, a pressure-regulating valve 110 operable under control of a controller 112 is connected in a portion of the air conduit 106. This pressure-regulating valve 110 has two operating positions, namely an atmospheric position for connecting the working air chamber 98 to the atmosphere and a vacuum position for connecting the working air chamber 98 to the vacuum source 108. The pressure-regulating valve 110 is alternately switched between the atmospheric position and the vacuum position under control of the controller 112. A variety of vacuum sources may be adoptable in the present invention. It is preferable to use as the vacuum source 108 a vacuum tank utilizing a negative pressure available from an air intake portion of an internal combustion engine of the vehicle, or a negative pressure-generating pump operated by the internal combustion engine, for example. The air conduit 106 may be formed of a resin material, a rigid rubber material, or the like, which exhibits a rigidity resistive to a pressure difference between an employed negative pressure and the atmosphere, and a high fluid-tight sealing.

In the engine mount 10 constructed as described above, the non-compressible fluid is forced to flow through the first orifice passage upon application of low frequency vibrations, such as engine shakes. Thus, the engine mount 10 is able to exhibit a high vibration damping effect with respect to the low frequency vibrations on the basis of resonance of the fluid flowing through the first orifice passage 96. When high frequency vibrations such as engine idling vibrations are applied to the engine mount 10, on the other hand, the operation of the pressure regulating valve 110 is suitably controlled by the controller 112 so that a air pressure in the working air chamber 98 is periodically changed at a frequency corresponding to the frequency of the engine idling vibrations. As a result, the movable rubber plate 64 is oscillated, causing a periodic change of the fluid pressure in the auxiliary fluid chamber 78. The periodic fluid pressure change in the auxiliary fluid chamber 78 is transmitted to the primary fluid chamber 76 through the second orifice passage 82. Thus, the engine mount 10 can exhibit active vibration damping effect with respect to the engine idling vibrations or other high frequency vibrations.

It should be appreciated that the engine mount 10 of the present invention is arranged such that the axially intermediate portion of the outer circumferential surface, which is interposed between the first and second circumferential grooves 40, 42 and exposed to the atmosphere, includes the recess 104, and such that the port 102 of the air passage 100 is formed within the recess so as to protrude radially outwardly from the bottom surface of the recess 104. This arrangement makes it possible to eliminate a need for forming a window through the second mounting member 14 bonded to the elastic body 16 and/or the fixing member 54 adapted to fix the peripheral portion of the flexible diaphragm 52 to the fixing member 36, as disclosed in JP-A-10-339350, in order to expose the opening of the air passage to the atmosphere, thus assuring a desired stability of the second mounting member 14 and the fixing member 54. Accordingly, the second mounting member 14 and the fixing member 54 of the present embodiment are less likely to be deformed in the above described drawing operations, making it possible to avoid undesirable formation of the voids or gaps between the inner circumferential surface of the small diameter portion 26 of the second mounting member 14 and the outer circumferential surface of the partition member 36, or between the inner circumferential surface of the fixing member 54 and the outer circumferential surface of the partition member 36. Thus, the engine mount 10 of the present invention can exhibit a high fluid-tight sealing of the pressure-receiving chamber 60 and the equilibrium chamber 62.

Another advantageous feature of the present embodiment is that the portion 102 is located in the intermediate portion of the outer circumferential surface of the intermediate portion that is interposed between the first and second circumferential grooves 40, 42 and exposed to the atmosphere. This arrangement can eliminate a need for positioning the partition member 36 relative to the second mounting member 14, in comparison with the case where the second mounting member is formed with the window through which the opening of the air passage formed in the partition member is exposed to the atmosphere, thus improving efficiency in manufacturing the engine mount 10.

Still another advantageous feature of the present embodiment is that the second mounting member 14 bonded to the elastic body 16 and the fixing member 54 adapted to fix the peripheral portion of the flexible diaphragm 54 are formed independently of each other. This arrangement makes it possible to directly bond the elastic body 16 to the inner circumferential surface of the second mounting member 14, thus assuring high bonding strength between the elastic body 16 and the second mounting member 14 in an effective manner.

Further, the second mounting member 14 and the fixing member 54 are made small in their axial length, making it possible to form these members 14, 54 with ease by pressing and drawing with the reduced number of steps.

Yet further, the engine mount 10 constructed according to the present embodiment is formed such that the engaging hook 28 integrally formed with the second mounting member 14 is press-fitted into the first circumferential groove 40 formed in the partition member 36 upon the drawing operation in which the second mounting member 14 is radially inwardly drawn onto the partition member 36, while the engaging hook 56 integrally formed with the fixing member 54 is press-fitted into the second circumferential groove 42 formed in the partition member 36 upon the drawing operation in which the fixing member 54 is radially inwardly drawn onto the partition member 36. Since the similar drawing operation has been adopted in the conventional fluid-filled vibration damping device, as disclosed in JP-A-10-339350, for radially inwardly drawn the second mounting member onto the metallic sleeve bonded to the outer circumferential surface of the elastic body, the drawing device is effectively utilized for manufacturing the engine mount 10 of the present embodiment. Thus, the engine mount 10 of the present embodiment can be manufactures without needing extensive changes of the manufacturing apparatus or additional arrangement or any additional manufacturing device.

Since the port 102 is housed within the recess 104 as described above, it is avoided that an external force acts on the port 102 due to an abutting contact of the port 102 with an external member or the like, during transportation of the vibration damping device 10, making it possible to effectively prevent a damage of the port 102.

Figure 2:
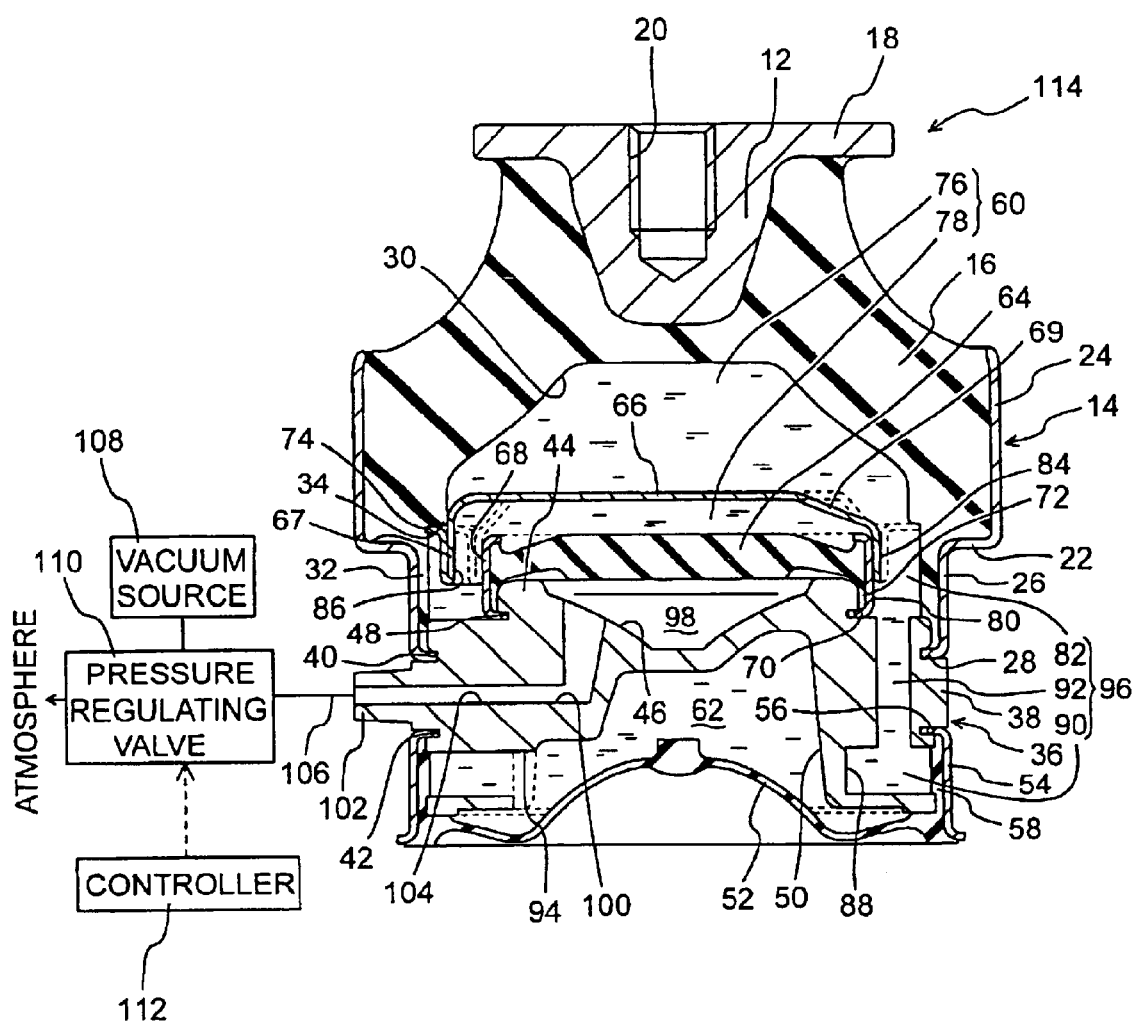
FIG. 2 is an elevational view in axial or vertical cross section of an engine mount for use in an automotive vehicle, which is constructed according to a second embodiment of the fluid-filled vibration-damping device of the invention.

Referring next to FIG. 2, there is shown an engine mount 114 constructed according to a second embodiment of the fluid-filled vibration-damping device of the present invention. The same reference numerals as used in the first embodiment will be used to identify the substantially identical elements, and no redundant description of these elements of the present embodiment will be provided.

In comparison with the engine mount 10 of the first embodiment, the engine mount 114 of this embodiment has no recess (104), so that the port 102 is integrally formed on and protrudes radially outwardly from the axially intermediate portion of the outer circumferential surface of the partition member 36, which is interposed between the first and second circumferential grooves 40, 42.

The engine mount 114 constructed as described above, the port 102 is formed on the axially intermediate portion of the outer circumferential surface of the partition member 36, which is interposed between the first and second circumferential grooves 40, 42. Therefore, the engine mount 114 of the present embodiment can enjoy the same advantageous features as described above with respect to the engine mount 10 of the first embodiment.

In particular, the partition member 36 does not include the recess (104), thus possibly decreasing an axial length of the partition member 36 by the axial length obtained by subtracting the outer diameter of the port 102 from the inner diameter of the recess (104). Thus, the engine mount 114 can be made compact in its axial length.

While the presently preferred embodiments of this invention has been described above by reference to the accompanying drawings, it is to be understood that the present invention is not limited to the details of the illustrated embodiments, but may be otherwise embodied.

Figure 3:
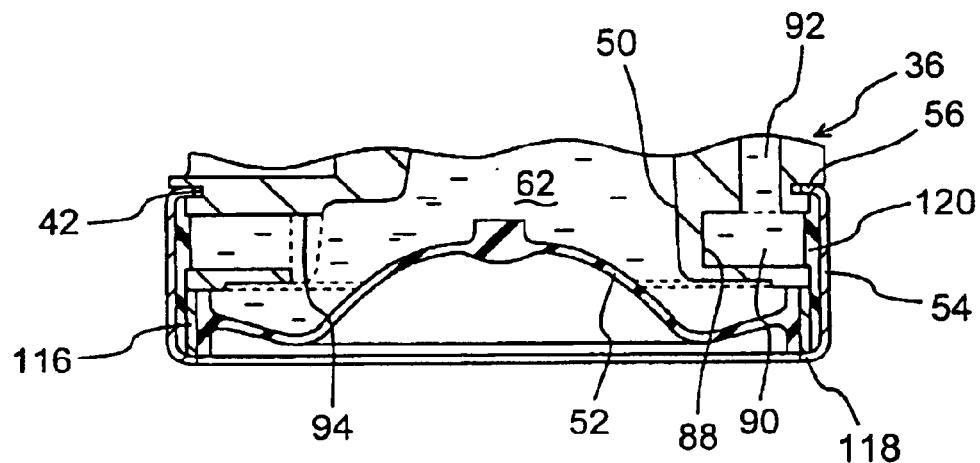
FIG. 3 is a fragmentally enlarged cross sectional view showing one modified structure for fixing a flexible diaphragm to a partition member, which is adoptable in the present invention.

While the flexible diaphragm 52 is bonded at its peripheral portion to the fixing member 54 in the illustrated first and second embodiments, it is not essential in the present invention to fix the flexible diaphragm 52 directly to the fixing member 54. Referring next to FIG. 3, there is shown another example of structure for fixing the flexible diaphragm 52 to the fixing member 54. The same reference numerals as used in the first and second embodiments will be used to identify the substantially identical elements, and no redundant description of these elements of the present embodiment will be provided.

According to the example illustrated in FIG. 3, the peripheral portion of the flexible diaphragm 52 is bonded to an annular metallic member in the form of a metallic ring 116. An axially lower end portion of the fixing member 54 is radially inwardly bent so as to provide an integrally formed annular inward projection 118. This fixing member 54 may be preferably formed by pressing, like the first embodiment. A sealing rubber layer 120 is bonded to an inner circumferential surface of the fixing member 54 over its entire area. After the metallic ring 116 is inserted into a bore of the fixing member 54, the fixing member 54 is subjected to a suitable drawing operation, like in the first embodiment. As a result, the engaging hook 56 is press-fitted into the second circumferential groove 42, whereby the fixing member 54 is fixed to the first partition member 36. With the fixing member 54 fixed to the first partition member 36 as described above, the metallic ring 116 is forcedly held by and between the inward projection 118 and the partition member 36 in the axial direction, whereby the peripheral portion of the flexible diaphragm 52 is indirectly fixed to the partition member 36.

Figure 4:
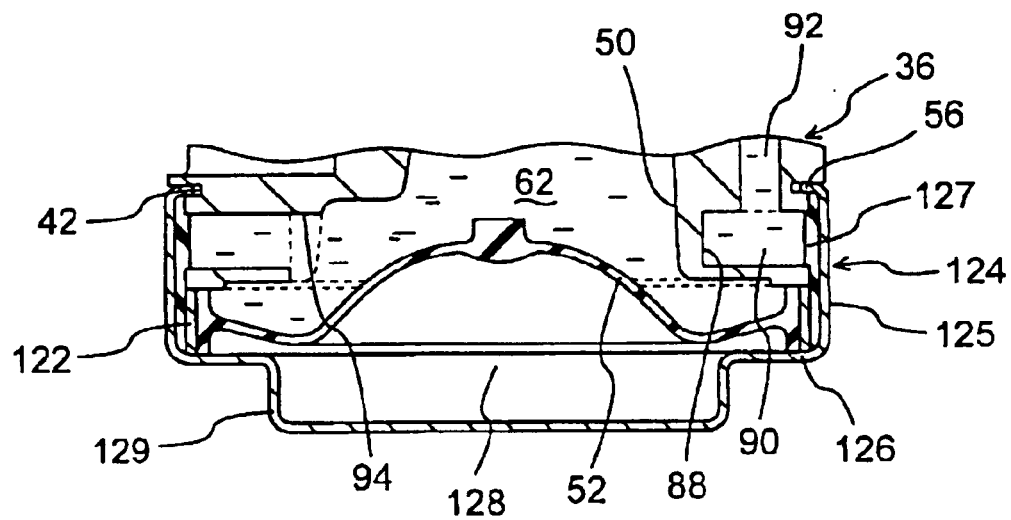
FIG. 4 is a fragmentally enlarged cross sectional view showing another modified structure for fixing the flexible diaphragm to the partition member, which is adoptable in the present invention.
Figure 1:
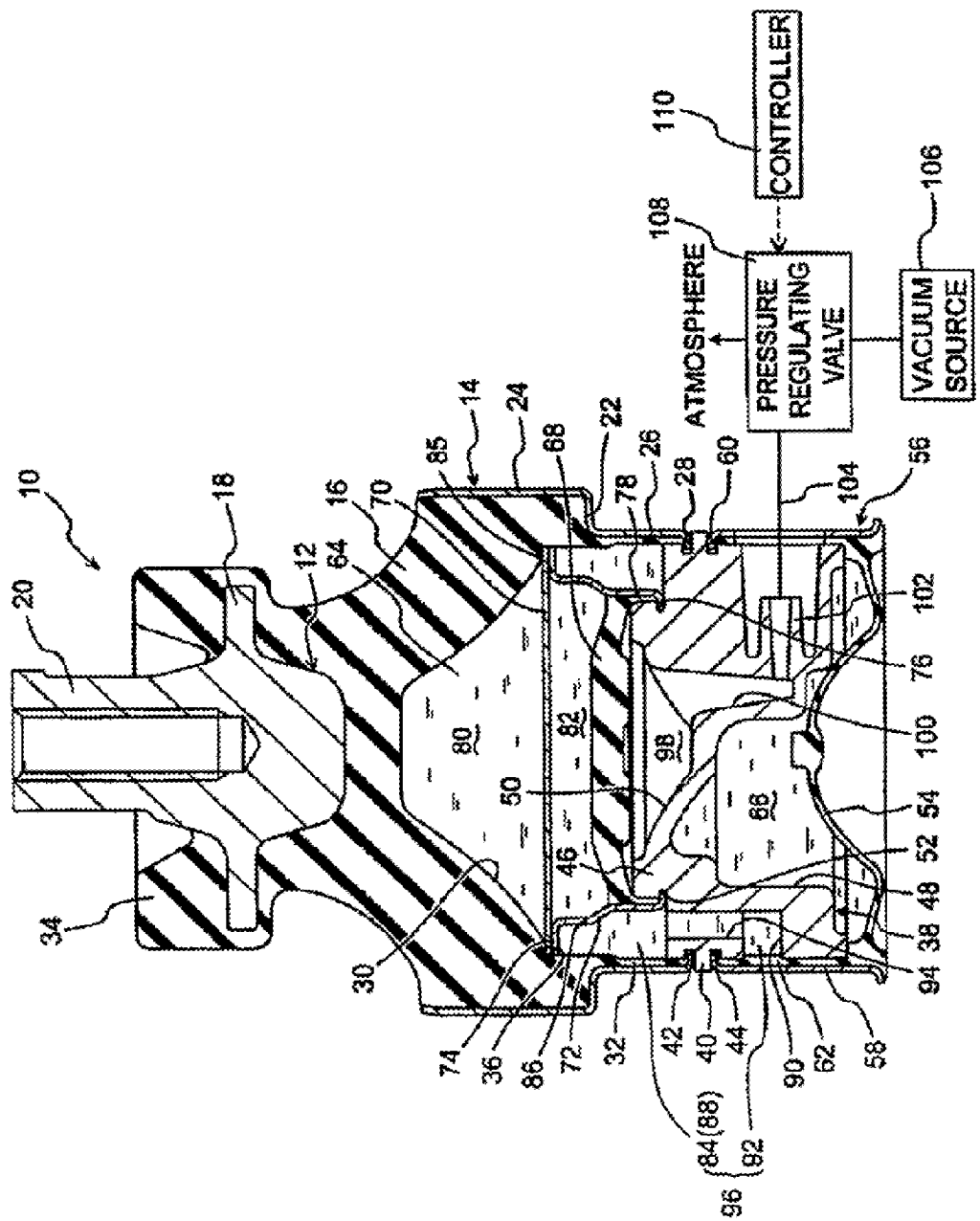
Figure 2:
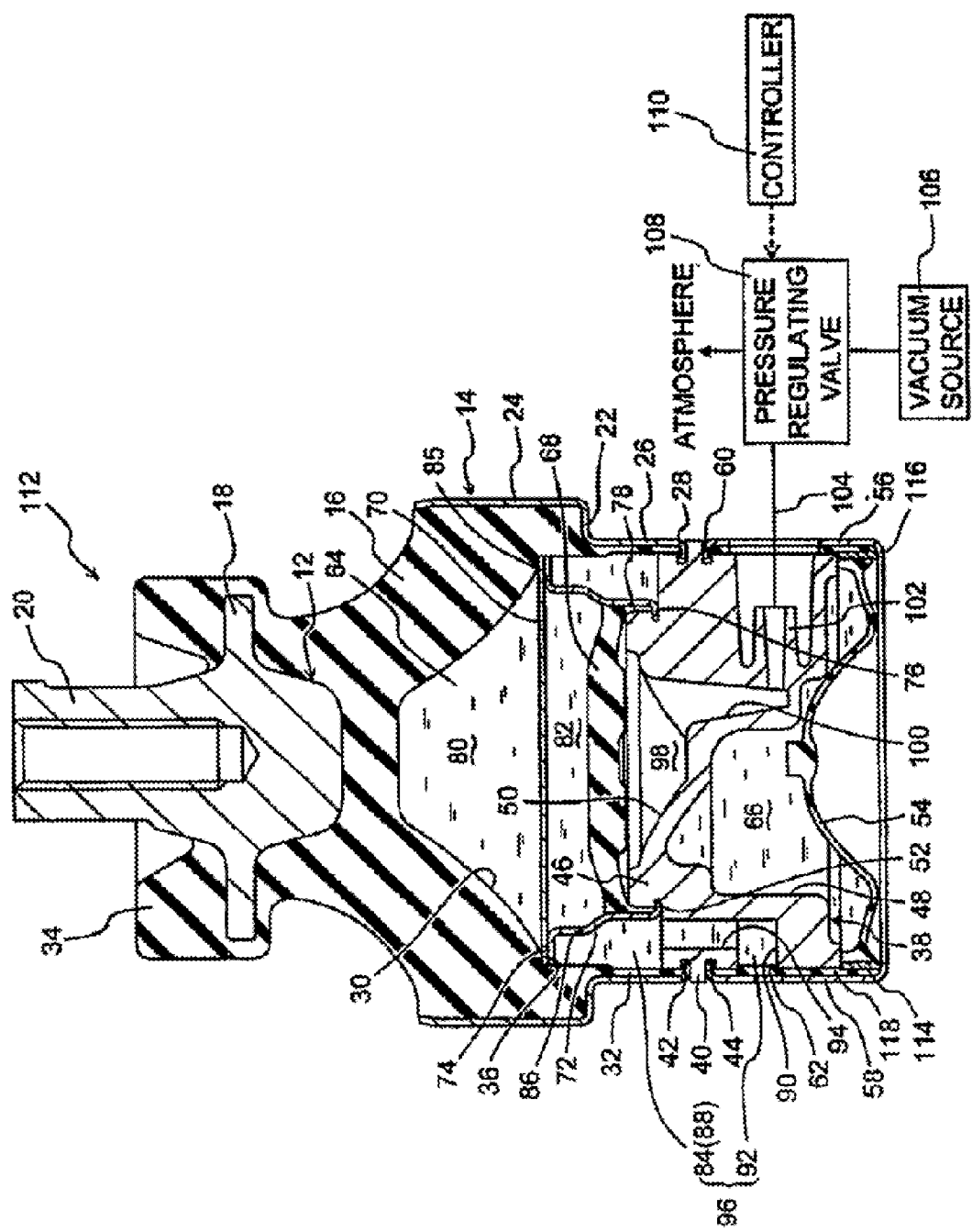
Figure 3:
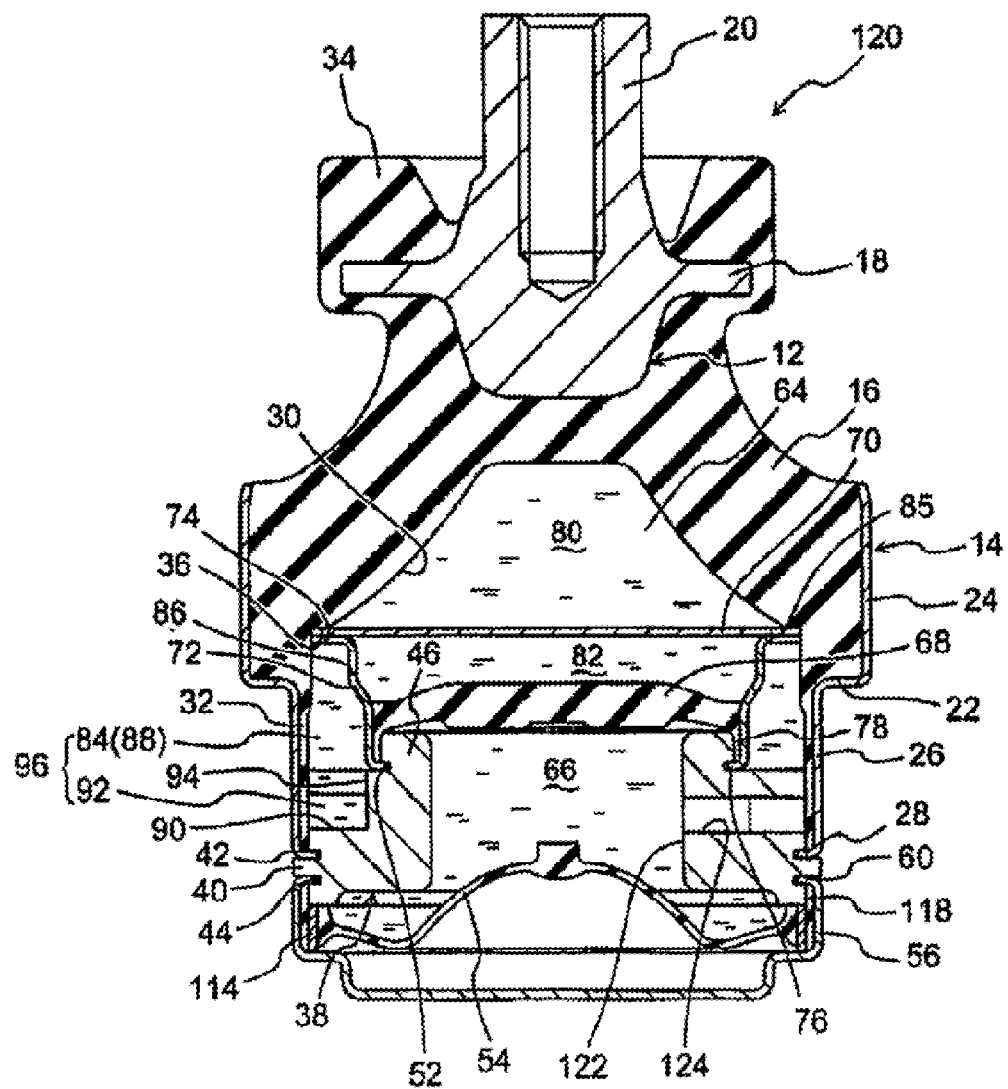

In the illustrated first and second embodiments, the flexible diaphragm 52 is disposed so as to be exposed to the external area. However, it may be possible to dispose the flexible diaphragm 52 in a non-exposed state, as shown in FIG. 4. The same reference numerals as used in the illustrated embodiments will be used in FIG. 4 to identify the corresponding components, and redundant description of these components will not be provided.

According to the example illustrated in FIG. 4, the peripheral portion of the flexible diaphragm 52 is fixed to an annular metallic ring 122 in the process of vulcanization of a rubber material for forming the flexible diaphragm 52. Further, it is employed a fixing member 124 that has a stepped shallow cup shape. The fixing member 124 includes an axially intermediate shoulder portion 126, a large diameter portion 125 located on the axially upper side of the shoulder portion 126, and a small diameter portion 129 located on the axially lower side of the shoulder portion 126, as seen in FIG. 4. The large diameter portion 125 has an inner circumferential surface that is coated by a sealing rubber layer 127. The metallic ring 122 is inserted into the large diameter portion 125 with its axially lower end face is held in abutting contact with the shoulder portion 126 and its outer circumferential surface is held in abutting contact with the inner circumferential surface of the large diameter portion 125 via the sealing rubber layer 127. With the metallic ring 122 disposed within the large diameter portion 125 as described above, the fixing member 124 is subjected to a suitable drawing operation, like in the first embodiment, whereby the fixing member 124 is firmly fixed to the partition member 36 with its engaging hook 56 being press-fitted into the second circumferential groove 42 of the partition member 36. In this state, the metallic ring 122 is forcedly held by and between the shoulder portion 126 of the fixing member 124 and the partition member 36, and the flexible diaphragm 52 and the fixing member 124 cooperate to form an air chamber 128. This air chamber 128 allows the deformation of the flexible diaphragm 52, while protecting the flexible diaphragm 52. It may be possible to form a through hole in the small diameter portion so as to expose the air chamber 128 to the atmosphere through the through hole.

In the illustrated first and second embodiments, the pressure regulating valve 110 is operated under control so as to apply to the working air chamber 98 air pressure variation at a frequency that is corresponding to the frequency of the vibration to be damped. Other modifications may be adoptable in replace to or in addition to the illustrated arrangement. For instance, the pressure-regulating valve 110 may be controlled to connect the working air chamber 98 to the vacuum source 108, upon application of vibrations whose frequency is corresponding to the frequency to which the first orifice passage 96 is tuned. In this arrangement, the movable rubber plate 64 is held in its retracted position, thereby preventing the elastic deformation of the movable rubber plate 64 to absorb the pressure change of the fluid in the auxiliary fluid chamber 78 and the pressure-receiving chamber 60. That is, this arrangement allow the fluid-filled vibration damping device 10 (114) to exhibit high vibration damping device on the basis of flows of the fluid through the first orifice passage 96, while assuring a sufficient amount of flow of the fluid through the first orifice passage 96. In order to hold the movable rubber plate 64 in its retracted state, the movable rubber plate 64 may be formed of a easily elastically deformable thin rubber layer, and may be retracted to be held in close contact with the bottom surface of the first recess 46, thus eliminating the working air chamber 98. This arrangement making it impossible for the movable rubber plate 64 to elastically deform to absorb the fluid pressure change in the pressure-receiving chamber 60. Alternatively, it may be possible to gradually change a value of negative pressure applied to the working air chamber 98. This makes it possible to gradually change spring characteristics of the movable rubber plate 64 that partially defining the auxiliary fluid chamber 78, i.e., the pressure-receiving chamber 60, thus permitting a change of the frequency to which the second orifice passage 82 is tuned.

In the illustrated first and second embodiments, the second partition member 66 is disposed within the pressure-receiving chamber 60 so as to divide the pressure-receiving chamber 60 into the primary fluid chamber 76 and the auxiliary fluid chamber 78. However, the second partition member 66 is not essential to practice the present invention, and it may be possible to directly control the pressure variation of the pressure-receiving chamber 60 by the movable rubber plate 64.

While the atmosphere and the vacuum source 108 are adopted as the pressure sources in the illustrated first and second embodiments so as to induce the pressure change in the working air chamber 98, a combination of a positive pressure source and the atmosphere or a combination of a positive pressure source and a negative pressure source may be adoptable to practice the present invention.

The first and second orifice passages 96, 82 may be suitably tuned according to frequencies of vibrations to be damped, without being limited to the illustrated embodiment. Also, the movable rubber plate 64 may be oscillated at a suitable frequency according to frequencies of vibrations to be damped.

While the fluid-filled vibration damping device in the form of the engine mount 10 (114) for automotive vehicles has been described above, the principle of the present invention is also applicable to various types of fluid-filled vibration damping devices used for various kinds of vibration members.

It is to be understood that the present invention may be embodied with various changes, modifications and improvements, which may occur to those skilled in the art, without departing from the spirit and scope of the present invention defined in the attached claims.

What is claimed is:

1. A fluid-filled vibration-damping device for connecting two members in a vibration damping fashion, comprising:

a first mounting member adapted to be fixed to one of the two members;

a second mounting member adapted to be fixed to an other one of the two members, said second mounting member having a cylindrical portion and being disposed relative to said first mounting member such that one of axially opposite open-end portions of said cylindrical portion of said second mounting member is opposed to said first mounting member with an axial spacing therebetween;

an elastic body elastically connecting said first mounting member and said second mounting member with an outer circumferential surface thereof being bonded to said cylindrical portion of said second mounting member;

a first partition member fixedly supported by said cylindrical portion of said second mounting member so as to form at one of axially opposite sides thereof a pressure-receiving chamber partially defined by said elastic body and at an other one of axially opposite sides thereof an equilibrium chamber partially defined by a flexible layer, said pressure-receiving chamber and said equilibrium chamber being filled with a non-compressible fluid, and being held in fluid communication with each other through a first orifice passage at least partially defined by said first partition member;

a movable member partially defining said pressure-receiving chamber and being supported by said first partition member in a movable manner;

a working air chamber being defined by and between said movable member and said first partition member and being open to an external area through an air passage formed through said first partition member; and a fixing member having a fixing sleeve portion and fixedly assembling a peripheral portion of said flexible layer to said first partition member, wherein said first partition member includes a first fixing groove and a second fixing groove, which are axially spaced apart from each other and open in an outer circumferential surface of said first partition member, while extending in a circumferential direction of said first partition member, and said first partition member is assembled at one of axially opposite end portions thereof with said second mounting member such that said cylindrical portion of said second mounting member is fixedly disposed radially outwardly on said one of axially opposite end portions of said first partition member with an other one of axially opposite open-end portions of said cylindrical portion thereof being press-fitted into said first fixing groove of said first partition member, and at an other one of axially opposite end portions thereof with said fixing member such that said fixing sleeve portion of said fixing member is fixedly disposed radially outwardly on said other one of axially opposite end portions of said first partition member with one of axially opposite open-end portions of said fixing sleeve portion being press-fitted into said second fixing groove of said first partition member, and wherein said air passage being open in an axially intermediate portion of said outer circumferential surface of said first partition member, which is axially interposed between said first and second fixing grooves and exposed to an atmosphere, such that an opening of said air passage is connectable to an external air conduit.

2. A fluid-filled vibration-damping device according to claim 1, wherein said fixing member has a cylindrical configuration, and said peripheral portion of said flexible layer is bonded to said fixing member upon vulcanization of a rubber material for forming said flexible layer.

3. A fluid-filled vibration-damping device according to claim 1, further comprising an annular metallic member formed independently of said fixing member, wherein said peripheral portion of said flexible layer is bonded to said annular metallic member, and said annular metallic member is fixed to said first partition member via said fixing member.

4. A fluid-filled vibration-damping device according to claim 1, wherein said first partition member has a first recess open to said one of axially opposite sides thereof in which said pressure-receiving chamber is formed, and said movable member fluid-tightly closes an opening of said first recess so that said working air chamber is formed by and between said first recess and said movable member.

5. A fluid-filled vibration-damping device according to claim 1, wherein said first partition member has a second recess open to said other one of axially opposite sides thereof in which said equilibrium chamber is formed, and partially defining said equilibrium chamber, and at least one of said opening of said air passage and said first orifice passage is formed in a peripheral portion of said second recess.

6. A fluid-filled vibration-damping device according to claim 1, wherein said axially intermediate portion of said outer circumferential surface of said first partition member has a recess, and said opening of said air passage comprises a cylindrical port protruding from a bottom surface of said recess into an inside said recess, said cylindrical port being connectable with the external air conduit.

7. A fluid-filled vibration-damping device according to claim 1, wherein said opening of said air passage comprises a cylindrical port that is formed on and protrudes from said axially intermediate portion of said outer circumferential surface of said first partition member, and that is connectable with the external air conduit.

8. A fluid-filled vibration-damping device according to claim 1, wherein said cylindrical portion of said second mounting member and said fixing cylindrical portion of said fixing member are fluid-tightly mounted onto respective portions of said outer circumferential surface of said first partition member with sealing rubber layers interposed therebetween over an entire circumference of said first partition member.

9. A fluid-filled vibration damping device according to claim 1, wherein said first orifice passage is formed at an outer circumferential surface of said partition member so as to extend with a given circumferential length in a circumferential direction of said partition member, said vibration damping device further comprising: a movable rubber plate disposed in a central portion of said partition member such that a fluid pressure in said pressure-receiving chamber acts on one of opposite surfaces of said movable rubber plate, and a fluid pressure in said equilibrium chamber acts on an other one of opposite surfaces of said movable rubber plate, said movable rubber plate being displaced due to a fluid pressure difference between said pressure-receiving chamber and said equilibrium chamber, for absorbing a fluid pressure variation induced in said pressure-receiving chamber upon application of vibrations whose frequency is higher than a frequency to which said first orifice passage is tuned.

10. A fluid-filled vibration-damping device according to claim 1, wherein said first partition member has a groove open in said outer circumferential surface thereof, and at least one of said cylindrical portion of said second mounting member and said fixing cylindrical portion of said fixing member fluid-tightly closing an opening of said groove so as to at least partially form said first orifice passage.

11. A fluid-filled vibration-damping device according to claim 1, further comprising:

a second partition member fixedly supported by said partition member and dividing said pressure-receiving chamber into a primary fluid chamber partially defined by said elastic body and subjected to a primary vibrational load, and an auxiliary fluid chamber partially defined by said movable member; and a second orifice passage for fluid communication between said primary fluid chamber and said auxiliary fluid chamber.

12. A fluid-filled vibration-damping device according to claim 1, wherein said first partition member includes a positioning projection interposed between said first and second fixing grooves in an axial direction thereof, while protruding radially outwardly and extending circumferentially over a substantially entire circumference thereof, and said positioning projection includes axially opposite end faces one of which defines an axially inner-side wall of said first fixing groove and protrudes radially outwardly from an axially outer-side wall of said first fixing groove, and an other of which defines an axially inner-side wall of said second fixing groove and protrudes radially outwardly from an axially outer-side wall of said second fixing groove.

* * * * *

UNITED STATES PATENT AND TRADEMARK OFFICE
CERTIFICATE OF CORRECTION

PATENT NO.        : 6,755,401 B2                                Page 1 of 13
APPLICATION NO. : 10/196505
DATED             : June 29, 2004
INVENTOR(S)       : Akasa et al.

It is certified that error appears in the above-identified patent and that said Letters Patent is hereby corrected as shown below:

THE TILTE PAGE, SHOWING AN ILLUSTRATIVE FIGURE, SHOULD BE DELETED AND SUBSTITUTE THEREFOR THE ATTACHED TITLE PAGE.

DELTE DRAWING SHEETS 1-3, AND SUBSTITUTE THEREFOR THE DRWAING SHEETS CONSISTIN OF FIGS 1-3 AS SHOWN ON THE ATTACHED PAGES.

PLEASE DELETE COLUMNS 1-20 AND INSERT THE ATTACHED COLUMNS 1-16 AS SHOWN.

Signed and Sealed this

Twenty-seventh Day of March, 2007

JON W. DUDAS
*Director of the United States Patent and Trademark Office*

United States Patent
Akasa et al.

(10) Patent No.: US 6,755,401 B2
(45) Date of Patent: Jun. 29, 2004

(54) FLUID-FILLED VIBRATION DAMPING DEVICE

(75) Inventors: Shouji Akasa, Ichinomiya (JP); Katsuhiko Katagiri, Ichinomiya (JP); Yuichi Ogawa, Kasugai (JP); Hideki Maehashi, Kasugai (JP); Akio Saiki, Komaki (JP)

(73) Assignee: Tokai Rubber Industries, Ltd., Komaki (JP)

(*) Notice: Subject to any disclaimer, the term of this patent is extended or adjusted under 35 U.S.C. 154(b) by 0 days.

(21) Appl. No.: 10/196,505

(22) Filed: Jul. 15, 2002

(65) Prior Publication Data
US 2003/0011115 A1 Jan. 16, 2003

(30) Foreign Application Priority Data
Jul. 16, 2001 (JP) .................................. 2001-215551

(51) Int. Cl.[7] .................................................. F16F 13/00
(52) U.S. Cl. ........................... 267/140.11; 267/140.13
(58) Field of Search ........................ 267/140.13, 140.14, 267/141, 219, 140.15

(56) References Cited

U.S. PATENT DOCUMENTS

| | | | |
|---|---|---|---|
| 5,170,998 A | * | 12/1992 | Muramatsu .......... 267/140.13 |
| 5,217,211 A | * | 6/1993 | Ide et al. ............ 267/140.13 |
| 5,246,212 A | * | 9/1993 | Funahashi et al. .... 267/140.13 |
| 5,775,666 A | | 7/1998 | Tsukamoto et al. |
| 5,992,833 A | * | 11/1999 | Tanahashi ........... 267/140.14 |
| 6,224,045 B1 | * | 5/2001 | Muramatsu et al. ... 267/140.13 |
| 6,523,813 B1 | * | 2/2003 | Kato ................... 267/140.11 |

FOREIGN PATENT DOCUMENTS

JP  9-89037  3/1997

* cited by examiner

*Primary Examiner*—Robert A. Siconolfi
*Assistant Examiner*—Melanie Torres
(74) *Attorney, Agent, or Firm*—Beyer Weaver & Thomas, LLP

(57) ABSTRACT

A fluid-filled vibration damping device includes an elastic body elastically connecting a first and a second mounting member so as to close one open-end portion of the second mounting member, and a partition member assembled with the second mounting member on one side thereof to form therebetween a pressure-receiving chamber partially defined by the elastic body and assembled with a fixing member on the other side thereof to form an equilibrium chamber partially defined by a flexible layer supported by the fixing member. The partition member includes a fixing groove to which open end peripheral portions of the cylindrical portion of the second mounting and the fixing sleeve portion of the fixing members are press-fitted, whereby the peripheral portion of the flexible layer is fixed to the partition member.

10 Claims, 3 Drawing Sheets

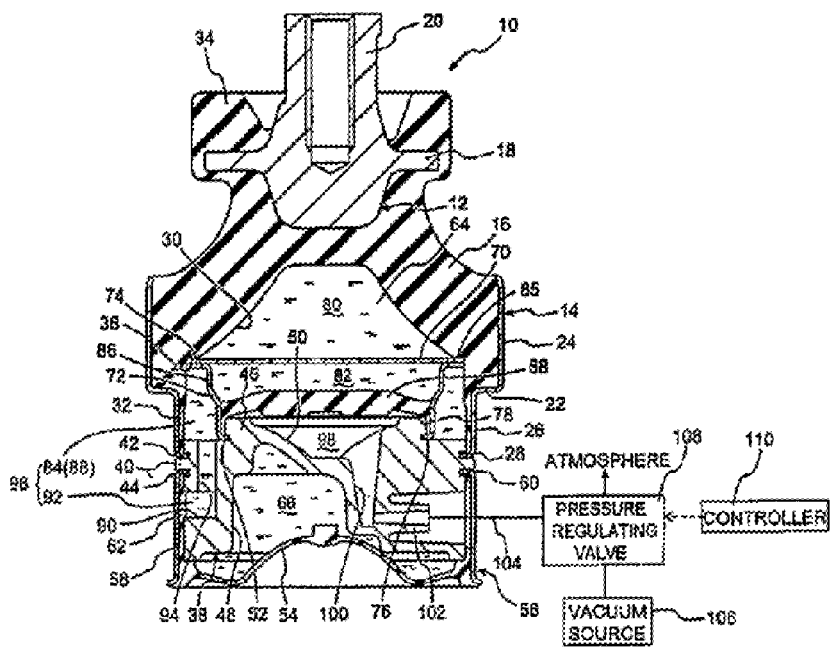

FLUID-FILLED VIBRATION DAMPING DEVICE

INCORPORATED BY REFERENCE

The disclosure of Japanese Patent Application No. 2001-215551 filed on Jul. 16, 2001 including the specification, drawings and abstract is incorporated herein by reference in its entirety.

BACKGROUND OF THE INVENTION

1. Field of the Invention

The present invention relates generally to a fluid-filled vibration damping device that exhibits vibration damping effect on the basis of flows of a non-compressible fluid filled therein, and more particularly to a fluid-filled vibration damping device, which is novel in construction, which is easy to manufacture, and which is suitably adoptable as an engine mount for use in an automotive vehicle.

2. Description of the Related Art

JP-A-9-89037 discloses a known example of a fluid-filled vibration damping device in which a rubber elastic body elastically connects metallic first and second mounting members, which are connectable to two members to be connected together in a vibration damping fashion. The second mounting member includes a cylindrical portion, and the first mounting member is opposed to one of axially opposite open-end portions with a spacing therebetween. A partition member is fixedly supported by the second mounting member so that a pressure-receiving chamber partially defined by the rubber elastic body and an equilibrium chamber partially defined by a flexible layer are formed on the both sides of the partition member. These pressure-receiving chamber and the equilibrium chamber are filled with a non-compressible fluid, and are held in fluid communication with each other through an orifice passage.

Such a conventional fluid-filled vibration damping device is capable of exhibiting excellent vibration damping effect based on resonance or flows of the fluid through the orifice passage. For this advantage, the conventional fluid-filled vibration damping device has been utilized as an engine mount, a body mount or the like for use in an automotive vehicle.

The conventional fluid-filled vibration damping device has a structure in which the second mounting member is formed of a generally cylindrical metallic member. One of axially opposite open-end of the second mounting member is fluid-tightly closed by a flexible rubber layer, and a partition member is press-fitted and fixedly disposed in a bore of the second mounting member. The other open-end of the second mounting member is fluid-tightly closed by the elastic body with the other open-end of the second mounting member being press-fitted onto a metallic sleeve that is bonded to an outer circumferential surface of the elastic body upon vulcanization of a rubber material to form the elastic body. Thus, a fluid-tightly closed interior space of the second mounting member is divided into two chambers, i.e., a pressure-receiving chamber partially defined by the elastic body and an equilibrium chamber partially defined by the flexible rubber layer, which are both filled with a non-compressible fluid.

However, the conventional fluid-filled vibration damping device constructed as described above inevitably requires a relatively large axial length of the second mounting member in order to receive the partition member in its bore. This makes it cumbersome to manufacture the second mounting member, pushing up a manufacturing cost. Also, the relatively long cylindrical second mounting member makes it difficult not only to assemble the partition member into the bore of the second mounting member, but also to bond the flexible rubber layer to the one open-end of the second mounting member in a process of vulcanization of a rubber material to form the flexible rubber layer, resulting in low manufacturing efficiency. In addition, since the other open-end of the second mounting member is just press-fitted onto the metallic sleeve bonded to the outer circumferential surface of the elastic body, the conventional fluid-filled vibration damping device does not assure sufficiently a bonding strength in its axial direction.

SUMMARY OF THE INVENTION

It is therefore one object of this invention to provide a fluid-filled vibration damping device which is novel and simple in structure and which permits a high efficiency in manufacture.

The above and/or other objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A fluid-filled vibration damping device for connecting two members in a vibration damping fashion, including (a) a first mounting member adapted to be fixed to one of the two members, (b) a second mounting member adapted to be fixed to an other one of the two members, the second mounting member having a cylindrical portion and being disposed relative to the first mounting member such that one of axially opposite open-end portions of the cylindrical portion of the second mounting member is opposed to the first mounting member with an axial spacing therebetween, (c) an elastic body elastically connecting the first mounting member and the second mounting member with an outer circumferential surface thereof being bonded to the cylindrical portion of the second mounting member in a process of vulcanization of a rubber material for forming the elastic body, (d) a partition member fixedly supported by the cylindrical portion of the second mounting member so as to form at one of axially opposite sides thereof a pressure-receiving chamber partially defined by the elastic body and at an other one of axially opposite sides thereof an equilibrium chamber partially defined by a flexible layer, the pressure-receiving chamber and the equilibrium chamber being filled with a non-compressible fluid and being held in fluid communication with each other through a first orifice passage at least partially defined by the partition member; and (e) a fixing member having a fixing sleeve portion and serving for fixedly assembling a peripheral portion of the flexible layer to the partition member, wherein the partition member includes a fixing groove open in an outer circumferential surface thereof while extending in a circumferential direction thereof, the cylindrical portion of the second mounting member is inserted onto the partition member from one of axially opposite sides of the partition member so that an open-end peripheral portion of the cylindrical portion is press-fitted into the fixing groove of the fixing member, and the fixing sleeve portion of the fixing member is inserted onto the partition member from an other one of axially opposite sides of the partition member so that an open-end peripheral portion of the fixing sleeve portion is press-fitted into the fixing groove of the fixing member, thereby fixedly assembling the peripheral portion of the flexible layer to the partition member via the fixing member.

In the fluid-filled vibration damping device according to this mode of the invention, the fixing member by which the peripheral portion of the flexible layer is fixedly assembled with the partition member, is formed independently of the second mounting member to which the elastic body is bonded. This arrangement makes it possible to directly bond the elastic body to the cylindrical portion of the second mounting member in the process of vulcanization of the rubber material to form the elastic body, thus eliminating a conventional need for a metallic sleeve. Therefore, the present fluid-filled vibration damping device is made simple in structure and is able to exhibit improved bonding strength and durability between the elastic body and the second mounting member, in comparison with the conventional fluid-filled vibration damping device in which the elastic body is indirectly bonded to the second mounting member such that the elastic body is bonded to the metallic sleeve upon vulcanization of the rubber material to form the elastic body, and then the second mounting member is press-fitted onto the metallic sleeve.

Since the second mounting member and the fixing member are formed independently of each other in the present fluid-filled vibration damping device, these two members can be made small in their axial length. This makes it possible to reduce the number of manufacturing steps, in the case where the second mounting member and the fixing member are formed of metal by pressing, for example. Thus, the second mounting member and the fixing member can be manufactured with improved efficiency.

Preferably, the cylindrical portion of the second mounting member and the fixing sleeve portion of the fixing member are provided with engaging hooks at their open-end peripheral portions, before these members are assembled with the partition member. Namely, one of axially opposite open-end portions of the cylindrical portion of the second mounting member is bend radially inwardly over its entire circumference to form the engaging hook. Likewise, one of axially opposite open-end portions of the fixing sleeve portion of the fixing member is bend radially inwardly over its entire circumference. Subsequently, these open-end portions provided with the engaging hooks of the cylindrical portion of the second mounting member and the fixing sleeve portion of the fixing member are inserted onto the partition member from axially opposite sides of the partition member. Then, the second mounting member and the fixing member are subjected to a suitable drawing operation to be drawn onto the partition member, so that the engaging hooks of the second mounting member and the fixing member are press-fitted into the fixing groove. A variety of methods may be employed to form the engaging hook at the open-end portion of the second mounting member or the fixing member. For instance, the second mounting member or the fixing member may be formed of a metallic plate by drawing into a cylindrical cup shaped member, and then the central area of the bottom wall portion of the formed second mounting member or the fixing member is cut off by punching. This makes it possible to integrally form the engaging hook at the open-end portion of the second mounting member and the fixing member, simultaneously.

In the present mode of the invention, an annular metallic member may be bonded to the peripheral portion of the flexible layer, and may be fixed to the partition member via the fixing member, for example. A variety of structures may be employed to fix the peripheral portion of the flexible layer to the partition member. Preferably, the following mode (2) may be employed to this end.

(2) A fluid-filled vibration damping device according to the above-indicated mode (1), wherein the fixing member has a cylindrical configuration, and the peripheral portion of the flexible layer is bonded to the fixing member upon vulcanization of a rubber material to form the flexible layer. This arrangement makes it possible to reduce the number of component and to simplify the structure of the device, effectively.

(3) A fluid-filled vibration damping device according to the above-indicated mode (1) or (2), wherein the partition member includes a pair of the fixing grooves which are axially spaced apart from each other, and the open-end peripheral portion of the cylindrical portion of the second mounting member is press-fitted into one of the fixing grooves axially opposite, while the open-end peripheral portion of the fixing sleeve portion of the fixing member is press-fitted into an other one of the fixing grooves axially opposite. This arrangement enables the second mounting member and the fixing member to be fixed to the partition member with excellent bonding strength and stability.

(4) A fluid-filled vibration damping device according to any one of the above-indicated modes (1)–(3), wherein the cylindrical portion of the second mounting member and the fixing cylindrical portion of the fixing member are fluid-tightly mounted onto respective portions of the outer circumferential surface of the partition member with sealing rubber layers interposed therebetween. The fluid-filled vibration damping device of this mode of the invention can exhibit a further improved fluid-tight sealing of the pressure-receiving chamber and the equilibrium chamber with ease and stability, with the help of such a simple structural arrangement.

(5) A fluid-filled vibration damping device according to any one of the above-described modes (1)–(4), wherein the orifice passage is formed at an outer circumferential portion of the partition member so as to extend with a given circumferential length in a circumferential direction of the partition member. This arrangement makes it possible to effectively obtain a length of the orifice passage, thereby enhancing degree of freedom in tuning the first orifice passage. For instance, the first orifice passage may be formed in a spiral shape so that the first orifice member has the length that is larger than a circumference of the partition member.

(6) A fluid-filled vibration damping device according to any one of the above described modes (1)–(5), further comprising an oscillating rubber plate supported at a peripheral portion thereof by the partition member such that the oscillating rubber plate is elastically displaceable, and partially defines the pressure-receiving chamber on one of opposite sides thereof and cooperates with the partition member to form a working air chamber on an other one of opposite sides thereof, wherein an air pressure variation is applied to the working air chamber to oscillate the oscillating rubber plate for thereby controlling a fluid pressure in the pressure-receiving chamber. In this mode of the invention, a periodic air pressure change at a frequency corresponding to that of vibrations to be damped may be applied to the working air chamber, so that the oscillating rubber plate is oscillated at the desired frequency, thereby attenuating vibration transmission from the first mounting member to the second mounting member in an offset manner. Thus, the fluid-filled vibration damping device of this mode of the invention can be manufactured with high efficiency and can exhibit excellent damping effect over a plurality of or wide frequency ranges of vibrations.

(7) A fluid-filled vibration damping device according to the above-indicated mode (6) of the invention, further comprises a partition plate fixedly supported by the second mounting member and dividing the pressure-receiving chamber into a primary fluid chamber partially defined by the elastic body and an auxiliary fluid chamber partially defined by the oscillating rubber plate, and a fluid passage for fluid communication between the primary fluid chamber and the auxiliary fluid chamber.

The fluid-filled vibration damping device constructed according to this mode of the invention is capable of exhibiting a further improved active or passive vibration damping effect, on the basis of flows of the fluid through the fluid passage. Described in detail, a periodic air pressure change at a frequency corresponding to that of vibrations to be damped is applied to the working air chamber to oscillate the oscillating rubber plate, thereby causing fluid pressure variation in the auxiliary fluid chamber. The induced fluid pressure variation in the auxiliary fluid chamber is effectively transmitted to the primary fluid chamber owing to flows of the fluid through the fluid passage, thereby actively controlling a fluid pressure variation in the primary fluid chamber so as to offset or attenuate vibration transmitted from the first mounting member to the second mounting member. For instance, the fluid passage may be tuned to a frequency that is approximately equal to the frequency at which the oscillating rubber plate is oscillated, making it possible to transmit the fluid pressure variation from the auxiliary fluid chamber to the primary fluid with improved efficiency. Alternatively, the fluid passage may be tuned to a frequency that is slightly higher than the frequency at which the oscillating rubber plate is oscillated, making it possible to restrict undesirable transmission of higher harmonics of the oscillation of the oscillating rubber plate from the auxiliary fluid chamber to the primary fluid chamber.

(8) A fluid-filled vibration damping device according to any one of the above-described modes (1)–(7), wherein the orifice passage is formed at an outer circumferential surface of the partition member so as to extend with a given circumferential length in a circumferential direction of the partition member, the vibration damping device further comprising: a movable rubber plate disposed in a central portion of the partition member such that a fluid pressure in the pressure-receiving chamber acts on one of opposite surfaces of the movable rubber plate, and a fluid pressure in the equilibrium chamber acts on an other one of opposite surfaces of the movable rubber plate, the movable rubber plate being displaced due to a fluid pressure difference between the pressure-receiving chamber and the equilibrium chamber, for absorbing a fluid pressure variation induced in the pressure-receiving chamber upon application of vibrations whose frequency is higher than a frequency to which the orifice passage is tuned. This arrangement enables the fluid-filled vibration damping device to exhibit not only a damping effect based on resonance or flows of the fluid through the orifice passage, but also a damping effect with respect to higher frequency vibrations based on absorption of a slight amount of the fluid pressure variation in the pressure-receiving chamber by the displacement of the movable rubber plate. Thus, the present vibration damping device can exhibit desired vibration damping effects over a plurality of frequency ranges or a wide frequency range of vibrations.

(9) A fluid-filled vibration damping device according to the above-indicated mode (8), further comprising: a partition plate fixedly supported by the second mounting member and dividing the pressure-receiving chamber into a primary fluid chamber partially defined by the elastic body and an auxiliary fluid chamber partially defined by the oscillating rubber plate; and a second orifice passage for fluid communication between the primary fluid chamber and the auxiliary fluid chamber, wherein the second orifice passage is tuned to a frequency higher than a frequency to which the orifice passage is tuned, and a fluid pressure in the primary fluid chamber acts on the movable rubber plate via the second orifice passage. In this arrangement, resonance or flows of the fluid through the second orifice passage allows the fluid-filled vibration damping device to exhibit damping effect based on the displacement of the movable rubber plate, effectively.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein:

FIG. 1 is an elevational view in axial or vertical cross section of an engine mount for use in an automotive vehicle, which is constructed according to a first embodiment of a fluid-filled vibration damping device of the invention;

FIG. 2 is an elevational view in axial or vertical cross section of an engine mount for use in an automotive vehicle, which is constructed according to a second embodiment of the fluid-filled vibration damping device of the invention; and FIG. 3 is an elevational view in axial or vertical cross section of an engine mount for use in an automotive vehicle, which is constructed according to a third embodiment of the fluid-filled vibration damping device of the invention.

DETAILED DESCRIPTION OF PREFERRED EMBODIMENTS

Referring first to FIG. 1, an engine mount 10 for use in an automotive vehicle is shown as a first embodiment of a fluid-filled vibration damping device of the present invention. The engine mount 10 is basically constructed such that a first mounting member 12 attachable to a power unit of the vehicle and a second mounting member 14 attachable to a body of the vehicle are elastically connected with each other via an elastic body 16 interposed therebetween. Thus, the engine mount 10 is installed between the power unit and the body for thereby elastically mount the power unit on the body of the vehicle in a vibration damping fashion. Since the engine mount 10 is installed on the vehicle with its central axis extending in the vertical direction as seen in FIG. 1 that is substantially parallel to the vertical direction, there will be described in detail the engine mount 10 in this orientation, basically.

The first mounting member 12 is made of a suitable metallic material, and has an inverted generally frusto-conical shape in its entirety. An annular plate like stop portion 18 is integrally formed at a large-diameter end portion of the first mounting member 12, so as to extend radially outwardly. A tapped hole portion 20 is also integrally formed at the large-diameter end portion of the first mounting member 12, so as to extend axially upwardly. This tapped hole portion 20 is adapted to receive a screw for attaching the first mounting member 12 to the power unit of the vehicle.

The second mounting member 14 is a generally cylindrical metallic member with a relatively large diameter including an axially intermediate shoulder portion 22, a large-diameter portion 24 located on the upper side of the shoulder portion 22, and a small-diameter portion 26 located on the lower side of the shoulder portion 22. That is, the second mounting member 14 provides a cylindrical portion in its entirety. One of axially opposite open end portions of the second mounting member 14, which is located on the side of the small-diameter portion 26, is radially inwardly bent over its entire circumference so as to provide an annular plate-like engaging hook 28 as an integral part of the second mounting member 14.

Preferably, the second mounting member 14 is formed by pressing, so that the integrally formed engaging hook 28 can be effectively formed. Namely, a suitable blank is drawn into a cylindrical cup shape with a given axial length, initially. Then, the engaging hook 28 can be formed by punching out a central portion of a bottom wall portion of the cylindrical cup shaped member.

The second mounting member 14 is press-fitted into a bore of a suitable cylindrical metal bracket (not shown), and fixed to the body of the vehicle via the bracket. The second mounting member 14 is disposed relative to the first mounting member 12 such that the large-diameter portion 24 of the second mounting member 14 is opposed to the first mounting member 12 with an axial spacing therebetween. These first and second mounting members 12, 14 are elastically connected with each other via the elastic body 16.

The elastic body 16 has a generally frusto-conical shape having a large-diameter recess 30 open in its large-diameter end face. The first mounting member 12 is bonded to a small diameter portion of the elastic body 16 in the process of vulcanization of a rubber material to form the elastic body 16, with the first mounting member 12 being embedded in the small diameter portion of the elastic body 16. An inner circumferential surface of the large-diameter portion 24 of the second mounting member 14 is bonded to the outer circumferential surface of the large-diameter portion of the elastic body 16 in the above-mentioned process of vulcanization. That is, the other one of axially opposite open end portion of the second mounting member 14, which is located on the side of the large-diameter portion 24, is fluid-tightly closed by the elastic body 16. A sealing rubber layer 32, which is integrally formed with the elastic body 16, is formed on and bonded to a substantially entire area of the inner circumferential surface of the small diameter portion 26. Further, a rubber buffer 34 integrally formed with the elastic body 16 is provided to the stop portion 18 of the first mounting member, so as to extend upwardly. The elastic body 16 further includes an annular shoulder portion 36 located near an open-end portion of the recess 30.

A partition member 38 is fixed to the open end portion of the second mounting member 14 on the side of the small diameter portion 26. The partition member 38 is a generally block shaped member made of a rigid material such as a rigid synthetic resin material and a metallic material. The partition member 38 includes a positioning projection 40 integrally formed on and slightly protruding radially outwardly from its outer circumferential surface. The positioning projection 40 extends circumferentially continuously over an entire circumference of the partition member 38. The partition member 38 is further provided with a pair of fixing grooves in the form of a pair of circumferential grooves 42, 44 that are located on the axially upper and lower sides of the positioning projection 40, respectively. Each of the circumferential grooves 42, 44 is open in the outer circumferential surface of the partition member 38, and extending in the circumferential direction with a generally constant width over the entire circumference of the partition member 38. In the present embodiment, the circumferential grooves 42, 44 are formed in parallel to each other with the positioning projection 40 interposed therebetween, by way of example. Also, the partition member 38 has a circular protrusion 46 formed on a central portion of the axially upper end face thereof, so as to extend axially outwardly or upwardly from the axially upper end face. The thus formed protrusion 46 is provided with a cavity 50 open in its protruding end face, and an outer circumferential groove 52 open in its proximal-side outer circumferential portion and extending with a substantially constant width dimension over the entire circumference thereof. The partition member 38 is further provided with a cavity 48 that is open in a central portion of the axially lower end face thereof.

A flexible layer in the form of a flexible diaphragm 54 is disposed below the partition member 38. The flexible diaphragm 54 is formed of a thin rubber layer having a disk-like shape. The flexible diaphragm 54 is fixed at its peripheral portion to a fixing member 56 in the process of vulcanization of a rubber material to form the flexible diaphragm 54, with a given amount of sag. The fixing member 56 is made of metal and has a large-diameter hollow cylindrical shape in its entirety. In this embodiment, the fixing member 56 provides a fixing cylindrical portion in its entirety. An axially upper open end portion of the fixing member 56 is radially inwardly bent over its entire circumference so as to provide an annular plate engaging hook 60 as an integral part of the second mounting member 14.

Preferably, the fixing member 56 is formed by pressing, so that the integrally formed engaging hook 60 can be effectively formed. Namely, a suitable blank is drawn into a cylindrical cup shape with a given axial length, and then the engaging hook 60 can be formed by punching out a central portion of a bottom wall portion of the cylindrical cup shaped member.

An axially lower open end portion of the fixing member 56 is fluid-tightly closed by the flexible diaphragm 54 with the peripheral portion of the flexible diaphragm 54 being bonded to an inner circumferential surface of the axially lower open end portion of the fixing member 56. As is apparent from the foregoing description, the flexible diaphragm 54 and the fixing member 56 are formed as an integral vulcanized assembly. The inner circumferential surface of the fixing member 56 is coated substantially entirely by a sealing rubber layer 62 integrally formed with the flexible diaphragm 54.

The second mounting member 14 is inserted onto the partition member 38 from the upper side of the partition member 38 until the axially upper end face of the positioning projection 40 is brought into abutting contact with the engaging hook 28 formed in the open-end portion of the small-diameter portion 26 of the second mounting member 14. With the partition member 38 and the second mounting member 14 positioned relative to each other in the axial direction as described above, a suitable drawing operation, such as an all directional drawing, is performed on the second mounting member 14 so as to decrease a diameter of the second mounting member 14. As a result, the engaging hook 28 formed in the small diameter portion 26 of the second mounting member 14 is forcedly press-fitted into the circumferential groove 42 formed in the axially upper side of the positioning projection 40 of the partition member 38. Thus, the axially lower open end portion of the second mounting member 14 on the side of the small diameter portion 26 is fluid-tightly closed by the partition member 38. On the other hand, the fixing member 56 is inserted onto the partition member 38 from the lower side of the partition member 38 until the axially lower end face of the positioning projection 40 is brought into abutting contact with the engaging hook 60 formed in the axially upper end portion of the fixing member 56. With the partition member 38 and the fixing member 56 positioned relative to each other in the axial direction as described above, a suitable drawing operation, such as an all directional drawing, is performed on the fixing member 56 so as to decrease a diameter of the fixing member 56. As a result, the engaging hook 60 formed in the fixing member 56 is forcedly press-fitted into the circumferential groove 44 formed in the axially lower side of the positioning projection 40 of the partition member 38. Thus, the axially upper open-end portion of the fixing member 56 is fluid-tightly closed by the partition member 38. It may be possible to perform these drawing operations simultaneously on the second mounting member 14 and the fixing member 56. In a state where the second mounting member 14 and the fixing member 56 are assembled with the partition member 38 as described above, the outer diameter of the small diameter portion 26 of the second mounting member 14 is made substantially equal to that of the fixing member 56, and the outer diameter of the positioning projection 40 of the partition member 38 is made slightly smaller than those of the small diameter portion 26 of the second mounting member 14 and the fixing member 56.

With the partition member 38 being assembled with the second mounting member 14 and the fixing member 56 as described above, a pressure-receiving chamber 64 is formed on the axially upper side of the partition member 38, while equilibrium chamber 66 is formed on the axially lower side of the partition member 38 as seen in FIG. 1. The pressure-receiving chamber 64 is partially defined by the elastic body 16 and is filled with a non-compressible fluid. On the other hand, the equilibrium chamber 66 is partially defined by the flexible diaphragm 54 and is filled with the non-compressible fluid, too. A various kinds of non-compressible fluids such as water, alkylene glycol, polyalkylene glycol, or silicone oil, may be adoptable in the present invention. For effective damping of input vibrations based on resonance of the fluid, which will be described later, it may be preferable to fill the pressure-receiving chamber 64 and the equilibrium chamber 66 with a low-viscosity fluid whose viscosity is not higher than 0.1 Pa·s.

The pressure-receiving chamber 64 houses therein an oscillating rubber plate in the form of a rubber elastic plate 68 and a partition plate 70. The rubber elastic plate 68 has a disk-like shape with a given thickness, and is bonded at its peripheral portion to a support sleeve 72 in the process of vulcanization of a rubber material for forming the rubber elastic plate 68. The support sleeve 72 is a thin-walled hollow cylindrical member whose axially upper end portion is radially outwardly bent over its entire circumference so as to provide an outward flange portion 74 as an integral part of the support sleeve 72. The axially lower end portion of the support sleeve 72 is radially inwardly bent over its entire circumference so as to provide an inward projection 76 as an integral part of the support sleeve 72. A sealing rubber layer 78 integrally formed with the rubber elastic plate 68 is bonded to an axially lower inner circumferential surface of the support sleeve 72 over its entire area. On the other hand, the partition plate 70 is a thin-disk like member formed of a rigid material such as a rigid synthetic resin material and a metallic material, for example. The lower end portion of the support sleeve 72 is mounted onto an upper end portion of the protrusion 46 formed in the partition member 38, and is radially inwardly drawn onto the protrusion 46, whereby the inward projection 76 is forcedly press-fitted into the outer circumferential groove 52 open in the outer circumferential portion of the protrusion 46. In the pressure-receiving chamber 64, the partition plate 70 extend radially outwardly with its peripheral portion being supported and forcedly gripped by the annular shoulder portion 36 of the elastic body 16 and the outer flange portion 74 of the support sleeve 72.

In this state, the partition plate 70 divides the pressure-receiving chamber 64 into two chambers, i.e., a primary fluid chamber 80 formed on the axially upper side of the partition plate 70 and partially defined by the elastic body 16, and an auxiliary fluid chamber 82 formed on the axially lower side of the partition plate 70 and partially defined by the rubber elastic plate 68. The support sleeve 72 and the partition member 38 cooperate to define a groove extending circumferentially and open to the radially outward direction. The opening of this is fluid-tightly closed by the second mounting member 14, thereby providing an upper circumferential fluid passage 84 which extends circumferentially around the support sleeve 72. One of opposite end of the upper circumferential fluid passage 84 is open to the primary fluid chamber 80 through a communication hole 85, and the other end of the upper circumferential fluid passage 84 is open to the auxiliary fluid chamber 82 through a communication hole 86. That is, the upper circumferential fluid passage 84 serves as a fluid passage 88 for fluid communication between the primary fluid chamber 80 and the auxiliary fluid chamber 82. In the present embodiment, the fluid passage 88 is tuned so that the engine mount 10 can exhibit an excellent vibration damping effect on the basis of resonance or flows of the fluid through the fluid passage 88 with respect to higher frequency vibrations, such as idling vibrations and the like, by way of example.

Further, the partition member 38 is provided with a circumferential groove 90 that is open in an outer circumferential surface of a cylindrical wall portion of the outer circumferential groove 52, and that extends in the circumferential direction. The circumferential groove 90 is located below the circumferential groove 44. The opening of the circumferential groove 90 is fluid-tightly closed by the fixing member 56 that is fixed to the partition member 38 as described above, to thereby form a lower circumferential fluid passage 92 extending circumferentially. One of circumferentially opposite ends of the lower circumferential fluid passage 92 is open to the fluid passage 88 through a communication hole 94. The other end of the lower circumferential fluid passage 92 is open to the equilibrium chamber 66 through another communication hole (not shown). Namely, the fluid passage 88 and the lower circumferential fluid passage 92 cooperate to form a first orifice passage in the form of an orifice passage 96 for a fluid communication between the primary fluid chamber 80 that partially constitutes the pressure-receiving chamber 64, and the equilibrium chamber 66. The orifice passage 96 is tuned so that the engine mount 10 can exhibit an excellent vibration damping effect on the basis of resonance or flows of the fluid through the orifice passage with respect to lower frequency vibrations, such as engine shakes and the like, by way of example.

In a state where the support sleeve 72 is fixed to the partition member 38 as described above, the rubber elastic plate 68 is disposed above the cavity 50 in its horizontal attitude so that the rubber elastic plate 68 is elastically deformable. Since the peripheral portion of the rubber elastic plate 68 is supported by the partition member 38, the opening of the cavity 50 is fluid-tightly closed by the rubber elastic plate 68 so that the rubber elastic plate 68 and the cavity 50 cooperate to define therebetween a working air chamber 98. An air passage 100 is formed through the partition member 38 and open in a bottom surface of the cavity 50 at one end. Thus, the working air chamber 98 is open to the atmosphere through the air passage 100. The other end of the air passage 100 is formed as a port 102. A suitable external air conduit 104 can be connected to the port 102 in operation. The external air conduit 104 permits to alternatively connect the working air chamber 98 to the atmosphere and a suitable vacuum source 106. Described in detail, a pressure-regulating valve 108 operable under control of a controller 110 is connected in a portion of the air conduit 104. This pressure-regulating valve 108 has two operating positions, namely an atmospheric position for connecting the working air chamber 98 to the atmosphere and a vacuum position for connecting the working air chamber 98 to the vacuum source 106. The pressure-regulating valve 108 is alternately switched between the atmospheric position and the vacuum position under control of the controller 110. A variety of vacuum sources may be adoptable in the present invention. It is preferable to use as the vacuum source 106 a vacuum tank utilizing a negative pressure available from an air intake portion of an internal combustion engine of the vehicle, or a negative pressure-generating pump operated by the internal combustion engine, for example.

In the engine mount 10 constructed as described above, the non-compressible fluid is forced to flow through the orifice passage 96 upon application of low frequency vibrations, such as engine shakes. Thus, the engine mount 10 is able to exhibit a high vibration damping effect with respect to the low frequency vibrations on the basis of resonance of the fluid flowing through the orifice passage 96. When high frequency vibrations such as engine idling vibrations are applied to the engine mount 10, on the other hand, the operation of the pressure-regulating valve 108 is suitably controlled by the controller 110 so that an air pressure in the working air chamber 98 is periodically changed at a frequency corresponding to the frequency of the engine idling vibrations. As a result, the rubber elastic plate 68 is oscillated, causing a periodic change of the fluid pressure in the auxiliary fluid chamber 82. The periodic fluid pressure change in the auxiliary fluid chamber 82 is transmitted to the primary fluid chamber 80 through the fluid passage 88. Thus, the engine mount 10 can exhibit an active vibration damping effect with respect to the engine idling vibrations or other high frequency vibrations.

In the present engine mount 10, the second mounting member 14 bonded to the elastic body 16 and the fixing member 56 adapted to fix the peripheral portion of the flexible diaphragm 54 to the partition member 38 are formed independently of each other. This arrangement makes it possible to directly bond the elastic body 16 to the inner circumferential surface of the second mounting member 14, thus assuring high bonding strength between the elastic body 16 and the second mounting member 14 in an effective manner.

Further, the second mounting member 14 and the fixing member 56 are made small in their axial length, making it possible to form these members 14, 56 with ease by pressing and drawing with the reduced number of steps.

Yet further, the engine mount 10 constructed according to the present embodiment is formed such that the engaging hook 28 integrally formed with the second mounting member 14 is press-fitted into the circumferential groove 42 formed in the partition member 38 upon the drawing operation in which the second mounting member 14 is radially inwardly drawn onto the partition member 38, while the engaging hook 60 integrally formed with the fixing member 56 is press-fitted into the circumferential groove 44 formed in the partition member 38 upon the drawing operation in which the fixing member 56 is radially inwardly drawn onto the partition member 38. Since the similar drawing operation has been adopted in the conventional fluid-filled vibration damping device, as disclosed in JP-A-9-89037, for radially inwardly drawing the second mounting member onto the metallic sleeve bonded to the outer circumferential surface of the elastic body, or for radially inwardly drawing the second mounting member onto the partition member to fixedly position the partition member relative to the second mounting member, the same drawing device is effectively utilized for manufacturing the engine mount 10 of the present embodiment.

While the first embodiment of this invention has been described above by reference to the accompanying drawings by way of example, it is to be understood that the present invention is not limited to the details of the first embodiment.

While the flexible diaphragm 54 is bonded at its peripheral portion to the fixing member 56 in the illustrated first embodiment, it is not essential in the present invention to fix the flexible diaphragm 54 directly to the fixing member 56. Referring next to FIG. 2, there is shown an engine mount 112 constructed according to the second embodiment of the invention. The same reference numerals as used in the first embodiment will be used to identify the substantially identical elements, and no redundant description of these elements of the present embodiment will be provided.

According to the second embodiment, the peripheral portion of the flexible diaphragm 54 is bonded to an annular metallic member in the form of a metallic ring 114. An axially lower end portion of the fixing member 56 is radially inwardly bent so as to provide an integrally formed annular inward projection 116. This fixing member 56 may be preferably formed by pressing, like the first embodiment. A sealing rubber layer 118 is bonded to an inner circumferential surface of the fixing member 56 over its entire area. After the metallic ring 114 is inserted into a bore of the fixing member 56, the fixing member 56 is subjected to a suitable drawing operation, like in the first embodiment. As a result, the engaging hook 60 is press-fitted into the circumferential groove 44, whereby the fixing member 56 is fixed to the partition member 38. With the fixing member 56 fixed to the partition member 38 as described above, the metallic ring 114 is forcedly held by and between the inward projection 116 and the partition member 38 in the axial direction, whereby the peripheral portion of the flexible diaphragm 54 is indirectly fixed to the partition member 38.

In the engine mount 112 constructed as described above, the second mounting member 14 bonded by vulcanization to the elastic body 16 and the metallic ring 114 bonded by vulcanization to the flexible diaphragm 38, is formed independently of each other, thereby enabling the elastic body 16 to be directly fixed to the second mounting member 14, like the first embodiment.

In the illustrated first and second embodiments, the working air chamber 98 is formed in the partition member 38 for permitting the engagement to exhibit active damping effect owing to oscillation of the rubber elastic plate 68. However, the principle of the present invention is applied to a passive-type vibration-damping device in which no working air chamber as well as the rubber elastic plate is provided. FIG. 3 shows an engine mount 120 constructed according to a third embodiment of the present invention. The same reference numerals as used in the second embodiment will be used in FIG. 3 to identify the corresponding components, and redundant description of these components will not be provided.

According to the present embodiment, the partition member 38 has a through hole 122 formed through its central portion in its axial direction. As a result, the rubber elastic plate 68 functioning as a movable rubber plate cooperates with the flexible diaphragm 54 to define therebetween the equilibrium chamber 66. Namely, this arrangement allows the rubber elastic plate 68 to receive a fluid pressure in the pressure-receiving chamber 64 (auxiliary fluid chamber 82) at one of opposite surfaces thereof and to receive a fluid pressure in the equilibrium chamber 66 at the other surface thereof. Therefore, the rubber elastic plate 68 can deform or displace to absorb a fluid pressure difference between the pressure-receiving chamber 64 (primary fluid chamber 80) and the equilibrium chamber 66, upon application of engine idling vibrations or other higher frequency vibrations. In this respect, the change in the fluid pressure in the primary fluid chamber can be transmitted to the auxiliary fluid chamber 82 through a second orifice passage in the form of the fluid passage 88 that is tuned to a frequency range higher than the frequency range to which the first orifice passage is tuned. Thus, the engine mount 120 can exhibit a damping effect on the basis of the displacement of the rubber elastic plate 68 with the help of the resonance or flows of the fluid through the fluid passage 88 in an effective manner. In addition, the fixing member 56 is shaped like a shallow cylindrical cup member. With the fixing member 56 fixed to the partition member 38, the fixing member 56 cooperates with the flexible diaphragm 54 to provide therebetween an air chamber for protecting the flexible diaphragm 54 while permitting displacement of the flexible diaphragm 54.

In the engine mount 120 constructed as described above, the second mounting member 14 bonded by vulcanization to the elastic body 16 and the metallic ring 114 bonded by vulcanization to the flexible diaphragm 54, are formed independently of each other, thereby enabling the elastic body 16 to be directly fixed to the second mounting member 14, like the first embodiment.

While the partition plate 70 is provided to divide the pressure-receiving chamber 64 in the illustrated first and second embodiments, the partition plate 70 is not essential to practice the present invention. The elimination of the partition plate 70 permits a direct control of the fluid pressure in the pressure-receiving chamber 64.

While the pair of circumferential grooves 42, 44 is formed in the partition member 38 as a fixing groove, in the illustrated embodiments, it may be possible to form one fixing groove in the partition member 38 and engaging hooks 28, 60 of the second mounting member 14 and the fixing member 56 are press-fitted into the same fixing groove with the engaging hooks 28, 60 laminated with each other.

The orifice passage 96 and the fluid passage 88 may be suitably tuned according to frequencies of vibrations to be damped, without being limited to the illustrated embodiment. Also, the rubber elastic plate 68 may be oscillated at a suitable frequency according to frequencies of vibrations to be damped.

According to the first and second embodiments, the periodic air pressure change is applied to the working air chamber 98 so that fluid-filled vibration damping device can exhibit an active damping effect on the basis of the oscillation of the rubber elastic plate 68. Alternatively, a static air pressure change may be applied to the working air chamber 98 so as to change spring characteristics of the rubber elastic plate 68 and a resultant wall spring stiffness of the auxiliary fluid chamber 82, making it possible to change the tuning frequency of the fluid passage 88 with the help of the change of the wall spring stiffness of the auxiliary fluid chamber 82.

While the fluid-filled vibration damping devices in the form of the engine mounts 10, 112, 120 for automotive vehicles have been described above, by way of example, the principle of the present invention is also applicable to various types of fluid-filled vibration damping devices used for various kinds of vibration members.

It is to be understood that the present invention may be embodied with various changes, modifications and improvements, which may occur to those skilled in the art, without departing from the spirit and scope of the present invention defined in the attached claims.

What is claimed is:

1. A fluid-filled vibration damping device for connecting two members in a vibration damping fashion, comprising:

a first mounting member adapted to be fixed to one of the two members;

a second mounting member adapted to be fixed to an other one of the two members, said second mounting member having a cylindrical portion and being disposed relative to said first mounting member such that one of axially opposite open-end portions of said cylindrical portion of said second mounting member is opposed to said first mounting member with an axial spacing therebetween;

an elastic body elastically connecting said first mounting member and said second mounting member with an outer circumferential surface thereof being bonded to said cylindrical portion of said second mounting member in a process of vulcanization of a rubber material for forming said elastic body;

a partition member fixedly supported by said cylindrical portion of said second mounting member so as to form at one of axially opposite sides thereof a pressure-receiving chamber partially defined by said elastic body and at an other one of axially opposite sides thereof an equilibrium chamber partially defined by a flexible layer, said pressure-receiving chamber and said equilibrium chamber being filled with a non-compressible fluid and being held in fluid communication with each other through a first orifice passage at least partially defined by said partition member, and a fixing member having a fixing sleeve portion and serving for fixedly assembling a peripheral portion of said flexible layer to said partition member, wherein said partition member includes a fixing groove open in an outer circumferential surface thereof while extending in a circumferential direction thereof, wherein said cylindrical portion of said second mounting member is inserted onto said partition member from said one of axially opposite sides of said partition member so that an open-end peripheral portion of said cylindrical portion is press-fitted into said fixing groove of said fixing member, and wherein said fixing sleeve portion of said fixing member is inserted onto said partition member from said other one of axially opposite sides of said partition member so that an open-end peripheral portion of said fixing sleeve portion is press-fitted into said fixing groove of said fixing member, thereby fixedly assembling said peripheral portion of said flexible layer to said partition member via said fixing member.

2. A fluid-filled vibration damping device according to claim 1, wherein said fixing member has a cylindrical configuration, and said peripheral portion of said flexible layer is bonded to said fixing member upon vulcanization of a rubber material for forming said flexible layer.

3. A fluid-filled vibration damping device according to claim 1, further comprising an annular metallic member formed independently of said fixing member, wherein said peripheral portion of said flexible layer is bonded to said annular metallic member, and said annular metallic member is fixed to said partition member via said fixing member.

4. A fluid-filled vibration damping device according to claim 1, wherein said partition member includes a pair of said fixing grooves which are axially spaced apart from each other, and said open-end peripheral portion of said cylindrical portion of said second mounting member is press-fitted into one of said fixing grooves axially opposite, while said open-end peripheral portion of said fixing sleeve portion of said fixing member is press-fitted into an other one of said fixing grooves axially opposite.

5. A fluid-filled vibration damping device according to claim 1, wherein said cylindrical portion of said second mounting member and said fixing sleeve portion of said fixing member are fluid-tightly mounted onto respective portions of said outer circumferential surface of said partition member with sealing rubber layers interposed therebetween.

6. A fluid-filled vibration damping device according to claim 1, wherein said first orifice passage is formed at an outer circumferential portion of said partition member so as to extend with a given circumferential length in a circumferential direction of said partition member.

7. A fluid-filled vibration damping device according to claim 1, further comprising an oscillating rubber plate supported at a peripheral portion thereof by said partition member such that said oscillating rubber plate is elastically displaceable, and partially defines said pressure-receiving chamber on one of opposite sides thereof and cooperate with said partition member to form a working air chamber on an other one of opposite sides thereof, wherein an air pressure variation is applied to said working air chamber to oscillate said oscillating rubber plate for thereby controlling a fluid pressure in said pressure-receiving chamber.

8. A fluid-filled vibration damping device according to claim 7, further comprises a partition plate fixedly supported by said second mounting member and dividing said pressure-receiving chamber into a primary fluid chamber partially defined by said elastic body and an auxiliary fluid chamber partially defined by said oscillating rubber plate, and a fluid passage for fluid communication between said primary fluid chamber and said auxiliary fluid chamber.

9. A fluid-filled vibration damping device according to claim 1, wherein said first orifice passage is formed at an outer circumferential surface of said partition member so as to extend with a given circumferential length in a circumferential direction of said partition member, said vibration damping device further comprising: a movable rubber plate disposed in a central portion of said partition member such that a fluid pressure in said pressure-receiving chamber acts on one of opposite surfaces of said movable rubber plate, and a fluid pressure in said equilibrium chamber acts on an other one of opposite surfaces of said movable rubber plate, said movable rubber plate being displaced due to a fluid pressure difference between said pressure-receiving chamber and said equilibrium chamber, for absorbing a fluid pressure variation induced in said pressure-receiving chamber upon application of vibrations whose frequency is higher than a frequency to which said first orifice passage is tuned.

10. A fluid-filled vibration damping device according to claim 9, further comprising: a partition plate fixedly supported by said second mounting member and dividing said pressure-receiving chamber into a primary fluid chamber partially defined by said elastic body and an auxiliary fluid chamber partially defined by said oscillating rubber plate; and a second orifice passage for fluid communication between said primary fluid chamber and said auxiliary fluid chamber; wherein said second orifice passage is tuned to a frequency higher than a frequency to which said orifice passage is tuned, and a fluid pressure in said primary fluid chamber acts on said movable rubber plate via said second orifice passage.

* * * * *